United States Patent
James et al.

(10) Patent No.: US 10,037,639 B2
(45) Date of Patent: Jul. 31, 2018

(54) INTELLIGENT PATHWAY ACCESS CONTROL

(71) Applicants: Tyler James, Plano, TX (US); Brandon Wilson, Plano, TX (US); Will Deaton, Plano, TX (US)

(72) Inventors: Tyler James, Plano, TX (US); Brandon Wilson, Plano, TX (US); Will Deaton, Plano, TX (US)

(*) Notice: Subject to any disclaimer, the term of this patent is extended or adjusted under 35 U.S.C. 154(b) by 0 days.

(21) Appl. No.: 15/286,054

(22) Filed: Oct. 5, 2016

(65) Prior Publication Data
US 2018/0096544 A1 Apr. 5, 2018

(51) Int. Cl.
*G07C 9/00* (2006.01)
*H04W 4/02* (2018.01)
*G06F 3/0484* (2013.01)
*G06K 9/00* (2006.01)

(52) U.S. Cl.
CPC ...... *G07C 9/00111* (2013.01); *G06F 3/04842* (2013.01); *G07C 9/00896* (2013.01); *H04W 4/023* (2013.01); *G06K 9/00664* (2013.01); *G06K 9/00671* (2013.01)

(58) Field of Classification Search
CPC ............ G07C 9/00111; G07C 9/00896; G06F 3/04842; G06K 9/00664; G06K 9/00671; H04W 4/023
USPC ........................................ 340/5.28, 5.5, 5.27
See application file for complete search history.

(56) References Cited

U.S. PATENT DOCUMENTS

| 4,845,490 A * | 7/1989 | Ward ................ G07C 9/00103 340/5.27 |
| 2006/0090101 A1* | 4/2006 | Schneider ................ G07C 1/20 714/38.14 |
| 2008/0201178 A1* | 8/2008 | Vizitei .............. G06F 17/30867 705/5 |
| 2009/0216438 A1* | 8/2009 | Shafer .................... G01C 21/20 701/414 |
| 2010/0023249 A1* | 1/2010 | Mays ..................... G01C 21/20 701/532 |
| 2014/0253285 A1* | 9/2014 | Menzel .............. G07C 9/00023 340/5.7 |
| 2015/0369612 A1* | 12/2015 | Nishimura ........... G01C 21/206 701/537 |
| 2016/0035161 A1* | 2/2016 | Friedli .................... B66B 1/468 340/5.28 |

* cited by examiner

*Primary Examiner* — Edwin Holloway, III
(74) *Attorney, Agent, or Firm* — Schwegman Lundberg & Woessner, P.A.

(57) ABSTRACT

Systems and techniques for intelligent pathway access control are described herein. A destination for an object and a reason the object is traveling to the destination may be obtained. A pathway may be established between a current location of the object and the destination using an electronic map of locations between the current location and the destination based on the reason the object is traveling to the destination. A set of access control features may be identified along the established pathway. A time window for arrival may be calculated for each access control feature of the set of access control features. The object may be allowed passage through an access control feature of the set of access control features based on a proximity of the object to the access control feature and a respective time window for arrival for the access control feature.

42 Claims, 17 Drawing Sheets

INTELLIGENT PATHWAY ACCESS CONTROL

BACKGROUND

Secure facilities include access control features such as electronic locks. People and objects may move through secure facilities. The people and objects pass through access control objects to travel between a current location and a destination.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
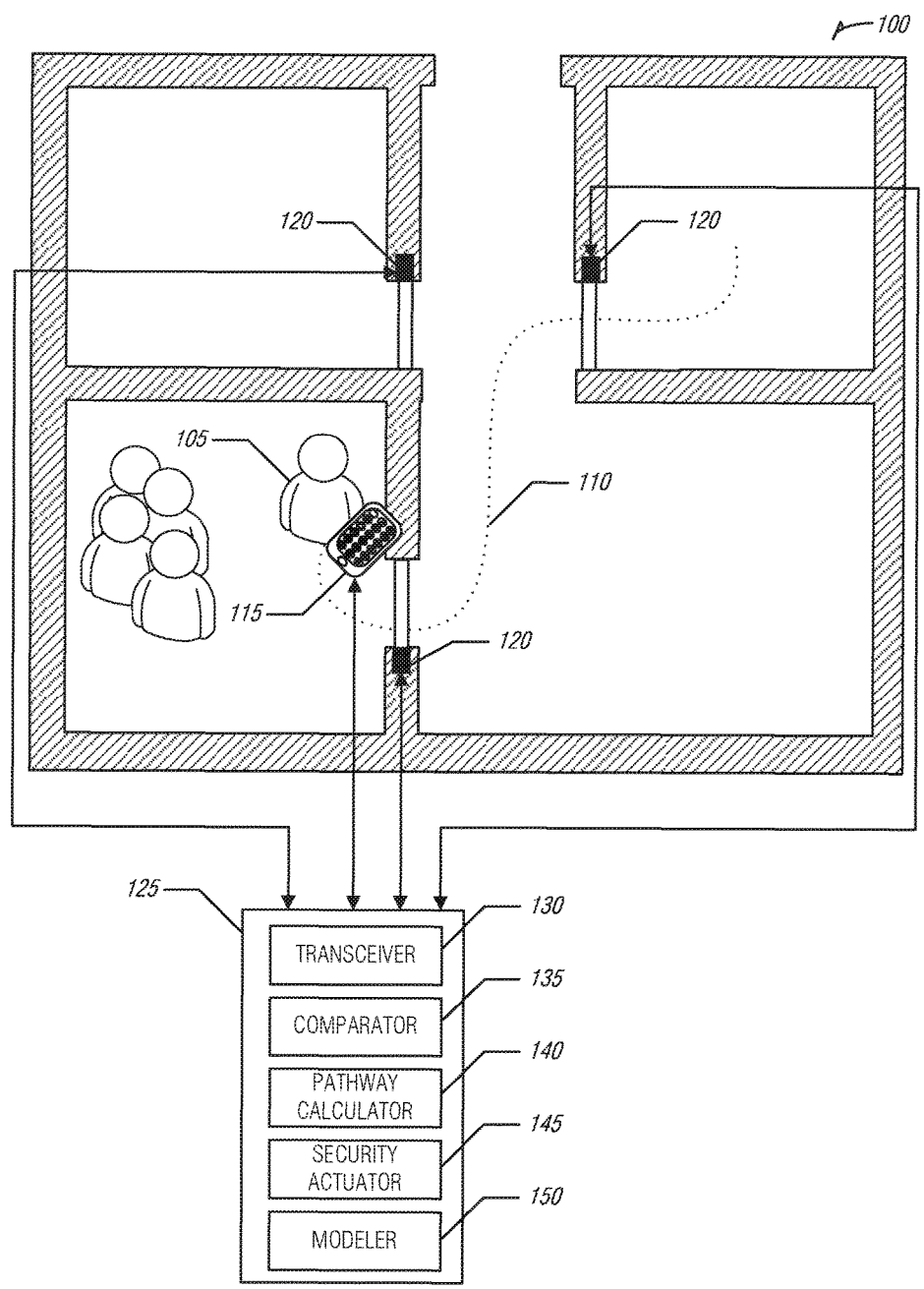
FIG. 1 illustrates an environment including a system for intelligent pathway access control, according to various embodiments.

Securing educational institutions is an increasing priority as shootings, abductions, and other student safety issues are increasingly making news headlines. School administrators are being asked to find ways to maximize student safety while the student is on school grounds. Knowing where students are and where students are supposed to be may increase student security and may reduce traditional school issues such as truancy.

An object, as used herein, refers to an item that may be traveling between two points. For example, an object may be a person. For example, an object may be an item such as a cart. In some examples, an object may be a combination of a person and an item. A pathway, as used herein, refers to a route between two points. A pathway may consist of a series of geographical features such as, for example, hallways, doorways, rooms, walkways, etc. In some examples, the pathway may include a starting point and multiple possible destinations. For example, the pathway may be a directed graph (e.g., a collection of vertices and edges, etc.). For example, a student may have a set of multiple allowed destinations but pre-determined order in which the destinations may be reached.

An access control feature, as used herein refers to a security control implemented for a geographical feature included in the pathway. For example, an access control feature may be an electronically controlled locking mechanism used to lock and unlock doors. In some examples, an access control feature may be a set of heuristic rules that may be challenged to proceed through a geographical feature of a pathway such as a doorway.

The present subject matter includes techniques for managing student movement on school grounds allowing teachers and administrators to determine where students should be and providing alerts if a student is not where the student should be. Students may wish to leave a current classroom and visit a destination such as another classroom, the bathroom, etc. The present subject matter establishes access control pathways for the student based on reasons provided for wanting to travel to the destination. For example, a student may wish to travel from a current study hall classroom to a chemistry classroom to complete a make-up exam. The present techniques may establish a pathway for the student upon determining that the reason provided is valid for the student and the student's destination.

The pathway from the student's current location to the destination may include a set of security features (e.g., electronic door locks, etc.) which may need to be deactivated to allow the student to reach the destination. Deactivating all of the access control features along the pathway at once or without the student present may provide an opportunity for a security breach (e.g., a kidnapper, students sneaking out of class, assailants, etc.). The present subject matter addresses these issues by assigning a time window to each access control feature along the path based on the time it is expected for the student to reach each access control feature and by deactivating each access control feature when the student is in proximity during a respective time window for each access control feature.

In some examples, simple timing constraints on a pathway may not be sufficiently expressive. For example, a student may need to access one of multiple destinations (e.g. any of several bathrooms) but no more than one. To address these cases, a time window may be assigned to an access control feature dynamically. For example, a student may visit one of several bathrooms and the time window may be assigned to each access control feature as the student progresses toward the bathroom and as the student's actual destination is identified (e.g., based on the progression of the student, etc.) time windows may be assigned to remaining access control features along the pathway to the actual destination and pathways leading to other possible destinations may be eliminated.

The student may provide a destination and reason for traveling to the destination via a user interface placed near an access control feature (e.g., the interior of a classroom in which the student is presently located, etc.). A repository of reason, destination, and student combinations may be referenced to determine if a pathway should be established for the student. In some examples, a pathway may not be established and a notification may be transmitted to a computing device of a teacher or administrator which may send a response indicating whether a pathway should be established.

In some examples, pathway rule preferences may be generated for teachers and administrators. For example, a teacher may be presented with a user interface including a questionnaire and the inputs received from the user interface may be used to generate a pathway rule preference for the teacher. In another example, prior responses to notifications by the teacher may be evaluated using machine learning techniques to establish a pathway rule preference for the teacher. In some examples, pathway establishment may be decided based upon a decision context which may consist of three categories of variables: automatically determined variables, student (or "object") input variables, and the input variables of pathway authorities (e.g. teachers and administrators). Machine learning may be used to automatically determine one or more of the variables.

Existing access control systems may provide binary access control decisions either allowing or denying access without an interactive component. The interactivity between the present subject matter, students, teachers, and administrators provides a compassionate and personalized access control system that may allow for the dynamics of a classroom environment. Thus, the present subject matter may provide real-time access control configurations based on the present needs of students, teachers, and administrators. For example, students may be able to contest a denial to establish a pathway by arguing that they should have the right to be somewhere. In another example, students may be able to argue that they were present in a class if they believe they were marked absent in error. The present subject matter may document pathway establishment and attendance decisions and may notify teachers and administrators in an effective way (e.g., using text message, email, etc.) when necessary. In another example, attendance decisions may be contested by showing (e.g., in a user interface, in a message, etc.) pictures to students or parents of the classroom and giving them the chance to show (e.g., via a user interface, etc.) where they are in the picture.

The present subject matter may use computer vision techniques to determine the location of objects (e.g., proximity to access control features, current location, etc.). The computer vision techniques may include, for example, image recognition, spatial relations ships between objects, and other techniques for computerized image acquisition, processing, and analysis. The computer vision techniques may provide the computing systems used in implementing the present subject matter with the ability to perform autonomous evaluations regarding the locations of objects within the computing systems' purview (e.g., within the range of sensors, such as cameras, communicatively coupled to the computing devices, etc.).

The present subject matter may use a variety of graphical user interfaces to receive input and display output to users. The graphical user interfaces may include a variety of windows, selectable user interface elements (e.g., buttons, sliders, radio buttons, etc., data input fields (e.g., textboxes, editable text fields, dropdown boxes, etc.), etc. In some examples, selection of a selectable user interface element may be detected as input. For example, a user may be presented with a list of potential destinations displayed as sliders and upon sliding a slider corresponding to a destination, the destination corresponding with the slider may be selected as a destination. In another example, the user may be presented with a list of reasons for traveling to a destination displayed as buttons and upon selection of a button corresponding to a button, the destination corresponding with the button may be obtained as the reason for traveling to the selected destination. The graphical user interfaces may be used, for example, to implement the interaction flows described in FIGS. 4A, 4B, 5A-5F, 6A, 6B, and 7.

While examples provided herein generally discuss educational facilities, it may be understood that the present subject matter may be employed in a variety of settings. For example, the present subject matter may be employed in secure office facilities, daycare facilities, correctional facilities, etc.

FIG. 1 illustrates an environment 100 including a system 125 for intelligent pathway access control, according to various embodiments. The environment 100 may represent a building (e.g., a school, office, etc.). The environment 100 may include an object 105 (e.g., a person, a student, etc.) and a pathway 110 (e.g., a route, etc.) between a current location of the object 105 and a destination (e.g., another room, a location of another object, etc.) to which the object 105 may be traveling. The environment 100 may include a computing device 115 (e.g., a tablet, etc.) and a variety of access control features 120 (e.g., electronic locks, etc.). The computing device 115 and the access control features 120 may be communicatively coupled (e.g., via wireless network, wired network, etc.) to a system 125 for intelligent pathway access control. The system 125 may include a variety of components such as a transceiver 130, a comparator 135, a pathway calculator 140, a security actuator 145, and a modeler 150.

A student (e.g., object 105) may be in a school classroom and may wish to travel to another classroom for a particular reason (e.g., to speak to a teacher, etc.). The student may input the destination and the reason into the computing device 115 placed on the interior of the classroom in which the student is currently located. The received inputs may be considered to be a pathway request. The pathway request may include a variety of information including, but not limited to, an identity of the requester (e.g., student), the destination, the reason, a time the request was submitted, etc. The computing device 115 ay include (e.g., through a locally installed application, a web browser, etc.) a user interface including a variety of user interface elements (e.g., text boxes, drop-down boxes, radio buttons, etc.) which may receive inputs from the user. The computing device 115 may transmit the inputs received to system 125.

The transceiver 130 may be responsible for receiving and processing incoming and outgoing data. The transceiver 130 may obtain (e.g., from a pathway request, etc.) a destination for an object (e.g., a student, etc.) and a reason the object is traveling to the destination. In an example, the destination and the reason the object is traveling to the destination may be obtained from the computing device 115 located on a first side of a first access control feature (e.g., an access control feature of the one or more access control features 120) of a set of access control features. In some examples, additional information such as an identity of the object, time the pathway request was made, etc. may be obtained by the transceiver 130.

The comparator 135 may receive inputs such as the reason, current location, destination, and identity of the student and may compare the inputs to a set of rule models to determine whether the pathway 110 should be established. The set of rule models may include a variety of decision models that the comparator 135 may use in determining whether a pathway request should be allowed, denied, or remediated (e.g., subjected to further processing, etc.). In some examples, the comparator 135 may compare a student, destination, and reason to a rule model including a list of allowed student, destination, and reason combinations to determine that the pathway 110 should be established.

In some examples, a user (e.g., teacher, administrator, etc.) of the system 125 may submit an identity of a student, a destination, and a reason to be included in the list. For example, a teacher may submit through a user interface of a computing device (e.g., computing device 115, a desktop computer, etc.) a set of inputs indicating that student Jane Doe should be allowed to go to a classroom of chemistry teacher Sara Smith at 2:30 PM to complete a chemistry exam and the comparator 135 may add to the list an entry indicating that a pathway may be established for Jane Doe to travel to a classroom corresponding with Sara Smith at 2:30 PM. The comparator 135 may provide a window of time for a student to begin travel to the destination. For example, a pathway may be established for Jane Doe to travel to the classroom corresponding with teacher Sara Smith between 2:25 PM to 2:35 PM and if a pathway request is received outside of the time widow the request may be denied. In some examples, the user (e.g., teacher, administrator, etc.) may be able to provide the comparator 135 instructions to allow a pathway to be created. For example, John Doe may be feeling ill and the teacher may provide inputs to a user interface providing immediate instructions to the comparator 135 to establish a pathway to a restroom.

If the comparator 135 does not find a match between the pathway request and a rule model (or the pathway request is otherwise denied), the comparator 135 may obtain additional inputs. The comparator 135 may transmit (e.g., using the transceiver 130) to the user interface of the computing device 115 a user interface indicating that the pathway 110 was not established and requesting additional information. For example, a user interface may be displayed to the student requesting the identity of a teacher that approved travel to the destination. The comparator 135 may use the additional information such as an identity of another user of the system 125 such as, for example, a teacher, in determining to whom a notification should be transmitted for approval to establish the pathway 110. In an example, the comparator 135 may store (e.g., in a database, memory, other computer storage device, etc.) a record of the pathway request with an indication that the pathway request was denied.

In an example, the comparator 135 may transmit (e.g., using the transceiver 130) a message to one or more teachers and administrators including the identity of the student, destination, and reason. The comparator 135 may then determine that the pathway 110 should be established based on receiving a response to the notification. For example, a notification may be transmitted to a teacher whom may respond that the student may travel to the destination and the comparator 135 may determine that the pathway 110 should be established upon receipt of the teacher's response. In some examples, a notification may be transmitted to a teacher of the current classroom and a teacher at the destination classroom and the comparator 135 may compare the responses to determine if a pathway should be established.

In some examples, the comparator 135 may reference a set of workflows to determine an approval hierarchy of teachers and administrators. The approval hierarchy may include a structure (e.g., tree, node diagram, etc.) of teachers and administrators responsible for responding to notifications. In an example, the comparator 135 may determine teachers and administrators corresponding to the current location of the student and the destination to which the student intends to travel. For example, notifications for destinations and reasons received from student John Doe may be transmitted to a teacher responsible for a current classroom in which John Doe is located, a teacher responsible for a classroom corresponding to the destination, and an assistant principal. The comparator 135 may then use the identified teachers along with the approval hierarchy to determine to whom notifications should be transmitted and how responses to the notification should be processed (e.g., response prioritization, etc.). In an example, the comparator 135 may use responses received from multiple teachers or administrators to determine that the pathway 110 should be established. For example, the comparator 135 may use a response from the teacher responsible for the student's current classroom and a response from the teacher responsible for the student's destination in determining the pathway 110 should be established.

In some examples, the comparator 135 may use rule models representing teacher and administrator preferences in determining that the pathway 110 should be established. The rule models may be generated by the modeler 150. The modeler 150 may review prior responses received from teachers and administrators to establish rule models representing the teacher and administrator preferences. The modeler 150 may evaluate the prior responses using a variety of machine learning techniques to determine relationships between a student, destination, reason, and one or more prior responses received from the teachers and administrators. Examples of machine learning techniques that may be used include, but are not limited to, linear regression, logistic regression, decision tree, naïve bayes, random forest, k-means, k-nearest neighbors, support vector machine, etc. For example, a set of prior responses from a teacher may indicate that the teacher may allow a student to visit a restroom twice during a class period and a rule model may be generated for the teacher that the comparator 135 may use to determine a pathway should be established if the student has provided a destination of a restroom with a reason of needing to use the restroom. For example, if the student has requested to visit the restroom two times or less the comparator 135 may determine a pathway should be established.

In some examples, a rule model may include pathway establishment rules for classes of objects (e.g., groups of students, etc.). For example, it may be determined that a school bus is behind schedule and the rule model may include an identity of each student on the bus, a destination for each student, and a reason of bus delay in a list of allowed pathways. In another example, a rule model for band students may include the identity of each student in the band. The students may need to leave school for a concert so each student may be added to a list of allowed pathways with a destination of the band room and a reason of concert. The concert may be at 2:30 pm and the rule model may allow the pathway to be established between 2:15 pm and 2:30 pm.

In some examples, the modeler 150 may use a set of inputs received (e.g., using the transceiver) to generate a rule model. In an example, a user interface may be generated for presentation to a user including a set of outputs (e.g., questions, etc.) requesting input from the user. For example, a teacher may be presented with a user interface on a computing device including a set of preference questions or statements to which the teacher may input a corresponding set of responses. The modeler 150 may use the received inputs to generate a rule model representing the inputs. For example, the teacher may respond to a question regarding how long after class students may be allowed to leave the classroom with a response of twenty minutes. A rule model may then be created including a time after class begins parameter of twenty minutes. The comparator 135 may then compare a pathway request to the rule model to determine if the request was received more than twenty minutes after class began and may use the determination in the determination of whether the pathway 110 should be established.

The modeler 150 may generate models indicating preferences (e.g., how, when, etc.) notifications should be sent to teachers and administrators. For example, a teacher may provide an indication through a user interface that notifications should be sent immediately for pathway requests including a reason of need to visit the restroom and pathway requests including a reason of taking a make-up test should be sent ten minutes after class starts and that notifications should be sent to a mobile computing device of the teacher. The modeler 150 may include the notification preferences in a rule model for the teacher.

In some examples, the modeler 150 may receive inputs from a user interface presented to a user (e.g., teacher, administrator, etc.) indicating that combinations of pathway requests should be denied. For example, an indication may be received from inputs received from a user interface presented to a teacher that pathway requests from students Marsha Bradley and Lisa Sampson for overlapping time periods should be denied. In some examples, the comparator 135 may determine that a pathway should be established for one student and not another student using a rule model including an indication that a combination of students should not have pathways established during an overlapping time period. In an example, the comparator 135 may establish respective pathways for the students and may provide inputs to the pathway calculator 140 to adjust the time windows for each pathway so the time windows do not overlap.

After the comparator 135 determines that the pathway 110 should be established, the comparator may transfer the current location and the destination to the pathway calculator 140. The pathway calculator 140 may reference a map (e.g., a floorplan and security configuration for a school, etc.) to determine a set of access control features (e.g., one or more access control features 120) between the current location of the student and the student's destination. For example, the student may be on the interior of a door controlled by an electronic lock in a locked state and may need to pass through the exterior of a door at the destination controlled by another electronic lock in a locked state.

The map be stored in a database, memory, or other computer storage device. The map may include the access control features 120 located throughout the school as well as a state of each access control feature. For example, the map may indicate that the interior door of a classroom in which the student is currently located is in an unlocked state and the exterior of a door of a destination classroom is in a locked state. The pathway calculator 140 may use the map to generate the pathway 110 including access control features through which the student may travel. The pathway calculator 140 may calculate a time window for each access control feature based on when the student is expected to reach each access control feature. The time windows may be referenced on a start time for initiating travel to the destination. For example, the pathway 110 may include a time window for a first access control feature to be from 9:45 to 9:45:30 and a time window for a second access control feature of 10:00:30 to 10:02:30. The pathway calculator 140 may use distances included in the map and other information such as an average speed of travel, etc. in calculating time windows.

The pathway calculator 140 may forward the pathway 110 to the security actuator 145. The security actuator 145 may control the access control features 120. The security actuator may use the pathway 110 and the time windows to control a set of access control features along the pathways. The security actuator 145 may determine if the student is in proximity to an access control feature along the path during a corresponding time window. For example, the security actuator 145 may determine if the student is at an exterior of a door at the destination between 10:00 and 10:01:30. The security actuator 145 may then allow the student to pass through the access control feature. For example, the exterior of a door at the destination in a locked state may be changed to an unlocked state by the security actuator 145 when the student is in proximity to the door at 10:00:30.

In some examples, the security actuator 145 may determine the student is in proximity to an access control feature using image recognition. For example, a camera may be placed with a view of the exterior of the door at the destination and an image captured of the student may be compared to a database of student images to determine the student is in proximity to the door. In some examples, the security actuator may use an item that the student has to determine the student is in proximity to the access control feature. For example, the student may have a card, button, or other item that may be read by the security actuator 145 and compared to a list of items to determine that the student is in proximity to the access control feature.

In some examples, the student may not reach an access control feature during a corresponding time window (or at all) and the security actuator 145 may transmit (e.g., using the transceiver) a notification to a teacher or an administrator indicating that the student has not reached the access control feature in the designated time. In some examples, the security actuator 145 may notify another party (e.g., a parent, guardian, etc.) about the student's movement. For example, the security actuator 145 may transmit a notification to a parent of a student if the classroom in which the student is currently located is in a lockdown state. In another example, the security actuator 145 may transmit a message to a parent of a student that has not arrived at a destination within a time window repetitively (e.g., 3 times in a month, etc.).

In some examples, another party may be authorized (e.g., using computer authentication and authorization techniques, etc.) to access a user interface indicating a current location of a student. For example, the parent of the student may receive a message that the student has not arrived at a destination within a time window 3 times and the parent may launch a user interface on a computing device communicatively coupled to the system 125 and the security actuator 145 may display an indication of a current (or last known) location (e.g., based on the last access control feature passed by the student, etc.) of the student in the user interface (e.g., displaying an icon for the student on a map of the school, etc.).

While the examples provided generally relate to students traveling on school grounds, it may be readily understood that the present subject matter may be applied to a variety of object traveling through a variety of environments. For example, the object may be a school visitor traveling through school grounds, the object may be an office worker traveling thorough office facilities, the object may be a prisoner traveling through a correctional facility, etc.

The present subject matter may be implemented in various configurations. For example, the transceiver 130, the comparator 135, the pathway calculator 140, the security actuator 145, and the modeler 150 may be implemented in different (or the same) computing systems (e.g., a single server, a collection of servers, a cloud-based computing platform, etc.). A computing system may comprise one or more processors (e.g., hardware processor 1002 described in FIG. 10, etc.) that execute software instructions, such as those used to define a software or computer program, stored in a computer-readable storage medium such as a memory device (e.g., a main memory 1004 and a static memory 1006 as described in FIG. 10, a Flash memory, random access memory (RAM), or any other type of volatile or non-volatile memory that stores instructions), or a storage device (e.g., a disk drive, or an optical drive). Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
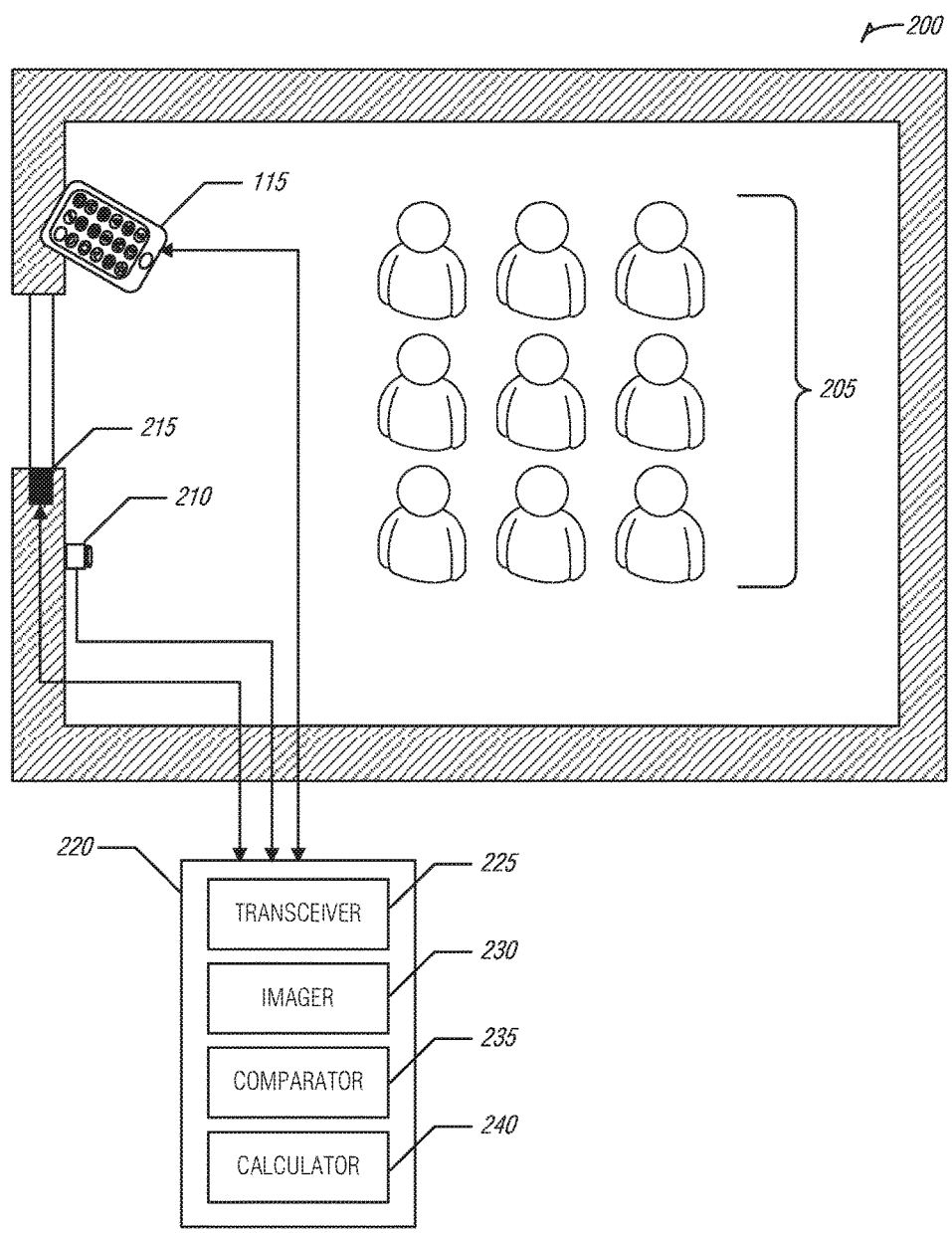
FIG. 2 illustrates an environment including a system for intelligent pathway access control, according to various embodiments.

FIG. 2 illustrates an environment 200 including a system 220 for intelligent pathway access control, according to various embodiments. The environment 200 may represent room (e.g., a classroom, a conference room, etc.). The environment 200 may include one or more objects (e.g., people, etc.) 205. The environment 200 may include a camera 210 positioned to observe the objects 205, an access control feature 215 (e.g., an electronic lock, etc.), and a computing device 115. The camera 210, the access control feature 215, and the computing device 115 may be communicatively coupled (e.g., via wireless network, via wired network, etc.) to system 220.

The one or more objects 205 may include a student. The student may be present in a classroom along with other students (e.g., other members of the one or more objects 205). Teachers and administrators may be interested in knowing who is (and isn't) present in a classroom. Teachers may miss students when taking attendance or other students may indicate a student is present that may not be present. Students may be assigned items such as a card including a radio frequency identifier (RFID) that may be used to take attendance. However, students may lose such an item. The present subject matter presents systems and techniques for taking attendance or otherwise determine the proximate location of an object (e.g., a student) using image recognition. The present subject matter may be used in conjunction with the security actuator 145 as described in FIG. 1 to determine a current location of a student and to determine a student's proximity to an access control feature such as access control feature 215.

The camera 210 may be positioned to observer the environment 200 and its contents including the objects 205. The camera 210 may capture (e.g., continuously, at intervals, etc.) images of the environment 200. The camera 210 may use a variety of imaging sensors such as, by way of example and not limitation, a charge-coupled device (CCD) image sensors and complementary metal-oxide-semiconductor (CMOS) image sensors. The inputs (e.g., images, etc.) collected from the camera 210 may be transmitted to the system 220.

The system 220 may include a variety of components including a transceiver 225, an imager 230, a comparator 235, and a calculator 240. The transceiver 225 may process incoming and outgoing data. The transceiver 225 may receive the inputs provided by the camera 210. The transceiver 225 may receive inputs provided by, and outputs transmitted to, the computing device 115 (e.g., as described in FIG. 1). The transceiver 225 may transmit the inputs received from the camera 210 to the imager 230.

The imager 230 may collect the images captured by the camera 210 and may store (e.g., in memory, a computer storage device, etc.) along with contextual information corresponding to the image. For example, an image may be stored with a time and date when the image was captured and a location where the image was captured. The imager 230 may generate a time sequenced image array representing a period of time (e.g., a class period, etc.). The imager 230 may provide images and image arrays as inputs to the comparator. In some examples, a light may shine for five seconds three times near the camera 210 and students may be asked to look at the light to make image capture more accurate.

The comparator 235 may compare inputs (e.g., images, image arrays, etc.) to a set of labeled images of objects to determine if an object is present. The comparator 235 may access a repository (e.g., database, computer storage location, etc.) of labeled images for use in the comparison. The comparator 235 may use a variety of image matching techniques to determine a match between an object present in the input and a labeled image of the object stored in the repository. By way of example and not limitation, the comparator 235 may use area based matching, correlation windows, cross correlation, least squares correlation, feature based matching, relation based matching, and image pyramid for determining a match between an object in an input image and a labeled image of an object stored in the repository. The comparator 235 may detect a set of objects in an input image. In an example, features may be extracted for each object of the set of objects and the features for each object may be compared to features of each labeled object in the repository. The comparator 235 may determine a matching labeled image for each object of the set of objects. The comparator 235 may then assign a label to each object identified in the input image with a label corresponding to its matched labeled image.

In some examples, the comparator 235 may be unable to match an object included in the input image with a labeled object in the repository. The comparator 235 may transmit (e.g., using the transceiver 225) a notification to a user (e.g., teacher, administrator, etc.) indicating that an unidentified object is present in the classroom. In an example, the notification may include an image of the unidentified object. The comparator 235 may store an image of the object that may later be labeled by a user. In some examples, the comparator 235 may transmit (e.g., using the transceiver 225) messages to another party (e.g., a parent of the student, guardian, etc.) regarding a student's movements in the classroom. For example, John Doe may be on a list of students expected to be in the classroom during a designated time period. However, John Doe may not have been identified in the input images and the comparator 235 may transmit an indication of John Doe's absence to John Doe's guardian.

In some examples, the message may include a link that when clicked opens a user interface allowing the other party to indicate a reason for an absence. In some examples, the message may include a link that when selected opens a user interface with an image of the classroom allowing the parent or guardian to label John Doe in the image. The comparator 235 may then label the object in the image using the label provided by the other party. For example, the comparator 235 may not have matched an image of John Doe included in the image capture to a repository of labeled student images, but the comparator 135 may assign the label assigned to the object by the parent to the object in the input image.

In some examples, the comparator 235 may reference a seating chart and may identify each seat in the input image.

The comparator 235 may identify that an object is present or not present in each seat. For example, seat 10 on the seating chart may be assigned to John Doe and the comparator may indicate that John Doe is present in the input image upon identifying an object in seat 10. Thus, the comparator 235 may identify the presence of an object without identifying the object. In some examples, the comparator 235 may take attendance by registering a student arriving in the room at certain time compared to where the student should be at the end of class.

The calculator 240 may receive the labeled input image from the comparator 235 and may calculate an attendance value for the class. In an example, the calculator 240 may reference a student list for the class and may assign each student of the list a presence value. For example, the comparator 235 may have labeled an object in an input image as Jane Doe and the calculator 240 may assign a presence value of 1 to the entry for Jane Doe on the student list. In another example, the calculator 240 may determine that Marsha Bradley is included in the student list and is not labeled in an input image and the calculator 240 may assign a presence value of 0 to the entry for Marsha Bradley on the student list. The calculator 240 may then calculate a total attendance value for the class. In an example, the calculator 140 may sum the presence values for each student listed on the student list.

In some examples, the calculator 240 may determine that an object is labeled in the input image without a corresponding entry in the student list. The calculator 240 may operate in conjunction with the comparator 235 to determine if the object belongs in the classroom. In an example, the calculator 240 may transmit a list of objects not found in the student list to the comparator 235. The comparator 235 may compare the list of objects to a set of rule models including a list of students and destinations. The comparator 235 may evaluate the labeled object and the current location of the labeled object to the list of students and destinations to determine a match. In some examples, the comparator 235 may be unable to determine that the object is authorized to be in the current location and a notification may be transmitted to a user (e.g., teacher, administrator, etc.) of the system 220.

The comparator 235 and the calculator 240 may periodically (or continuously) process input images to determine changes in classroom composition over time. For example, at the beginning of class there may be 20 students present and five minutes later 25 students may be present. In another example, students may not be positioned in the class such that the comparator 235 is able to successfully label students in the classroom in each input image. The comparator 235 and the calculator 240 may work in conjunction to determine the presence of students over time. For example, John Doe may be labeled by the comparator 235 in an input image captured at 1:30, not labeled by the comparator 235 in an input image captured at 1:31, and labeled by the comparator 235 in an input image captured at 1:32 and the calculator 240 may determine that John Doe is present based on the frequency with John Doe is labeled in the input images.

In some examples, the camera 210 may be placed such that it observes the proximity of the access control feature 215. The comparator 235 may determine if an object such as a student is in proximity to the access control feature 215. For example, the camera 210 may observe a five foot radius proximate to an interior door of a classroom having an electronic locking mechanism. The comparator 235 may identify an object is within proximity to the access control feature 215 when the comparator 235 is able to label the object in an input image as described above. The comparator 235 may transmit (e.g., using the transceiver 215, etc.) the determination of the proximity of the object to a security actuator (e.g., the security actuator 145 as described in FIG. 1). The security actuator may use the proximity determination to disengage the access control feature 215 to allow the object to continue along a pathway to a destination.

While the examples provided generally relate to students traveling on school grounds, it may be readily understood that the present subject matter may be applied to a variety of object traveling through a variety of environments. For example, the object may be a school visitor traveling through school grounds, the object may be an office worker traveling thorough office facilities, the object may be a prisoner traveling through a correctional facility, etc. In some examples, the present subject matter may be used as a security factor in a multifactor security protocol including elements comprising what an object knows, what an object has, and what an object is. The present subject matter may be capable of providing elements of what an object is (e.g., matching the object in an input image to a labeled object) and what an object has (e.g., labeling an item in possession of the labeled object in the input image).

The present subject matter may be implemented in various configurations. For example, the transceiver 225, the imager 230, the comparator 235, and the calculator 240 may be implemented in different (or the same) computing systems (e.g., a single server, a collection of servers, a cloud-based computing platform, etc.). A computing system may comprise one or more processors (e.g., hardware processor 1002 described in FIG. 10, etc.) that execute software instructions, such as those used to define a software or computer program, stored in a computer-readable storage medium such as a memory device (e.g., a main memory 1004 and a static memory 1006 as described in FIG. 10, a Flash memory, random access memory (RAM), or any other type of volatile or non-volatile memory that stores instructions), or a storage device (e.g., a disk drive, or an optical drive). Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 3:
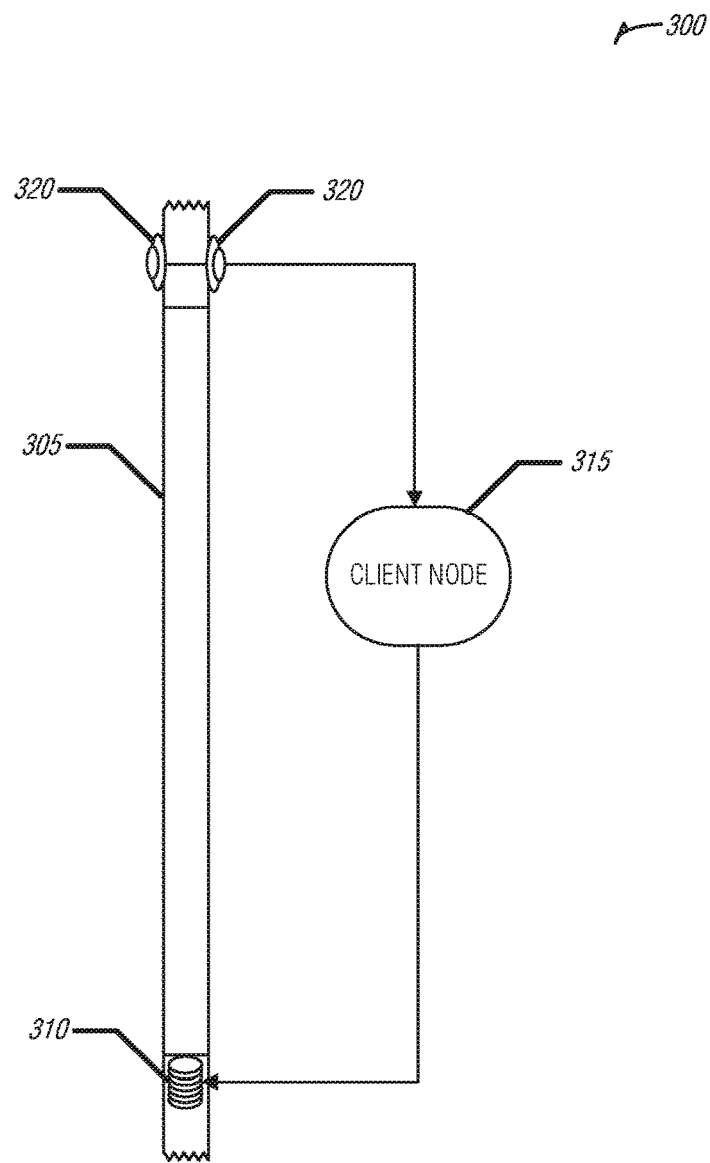
FIG. 3 illustrates an example access control feature for intelligent pathway access control, according to various embodiments.

FIG. 3 illustrates an example access control feature 300 for intelligent pathway access control, according to various embodiments. The access control feature 300 may include a door 305 with egress and ingress controlled by an electronic lockset 310. The electronic lockset 310 may be communicatively coupled (e.g., via wireless network, wired network, direct wired, etc. to a client node 315. The client node 315 may provide control logic for the electronic lockset 310. The client node 315 may be communicatively coupled (e.g., via wireless network, wired network, etc.) to a system for intelligent pathway access control such as system 125 as described in FIG. 1. The client node 315 may receive instructions from a security actuator (e.g., security actuator 145 as described in FIG. 1) to engage and disengage the electronic lockset 310 based on the proximity of a user to the access control feature 300 providing similar functionality as the access control features 120 as described in FIG. 1.

In an emergency situation (e.g., extended power failure, fire, etc.) the electronic lockset 310 may be disengaged manually. To this end, one or more override devices 320 (e.g., a keyed override switch, an emergency button behind glass with a glass breakage alarm, etc.) may be positioned on the ingress and egress sides of the door 305. The override devices 320 may be communicatively coupled (e.g., via wireless network, via wired network, direct wired, etc.) to the client node 315. The client node 315 may monitor inputs from the override devices and may disengage the electronic lock 310 upon receiving an input indicating the electronic lockset should be disengaged.

While the examples generally describe an electronic lockset, it may be readily understood that the present subject matter may be used in a variety of access control features such as, by way of example and not limitation, electronic gate controls, door actuators (e.g., elevator doors, etc.), turnstiles, etc.

Figure 4A:
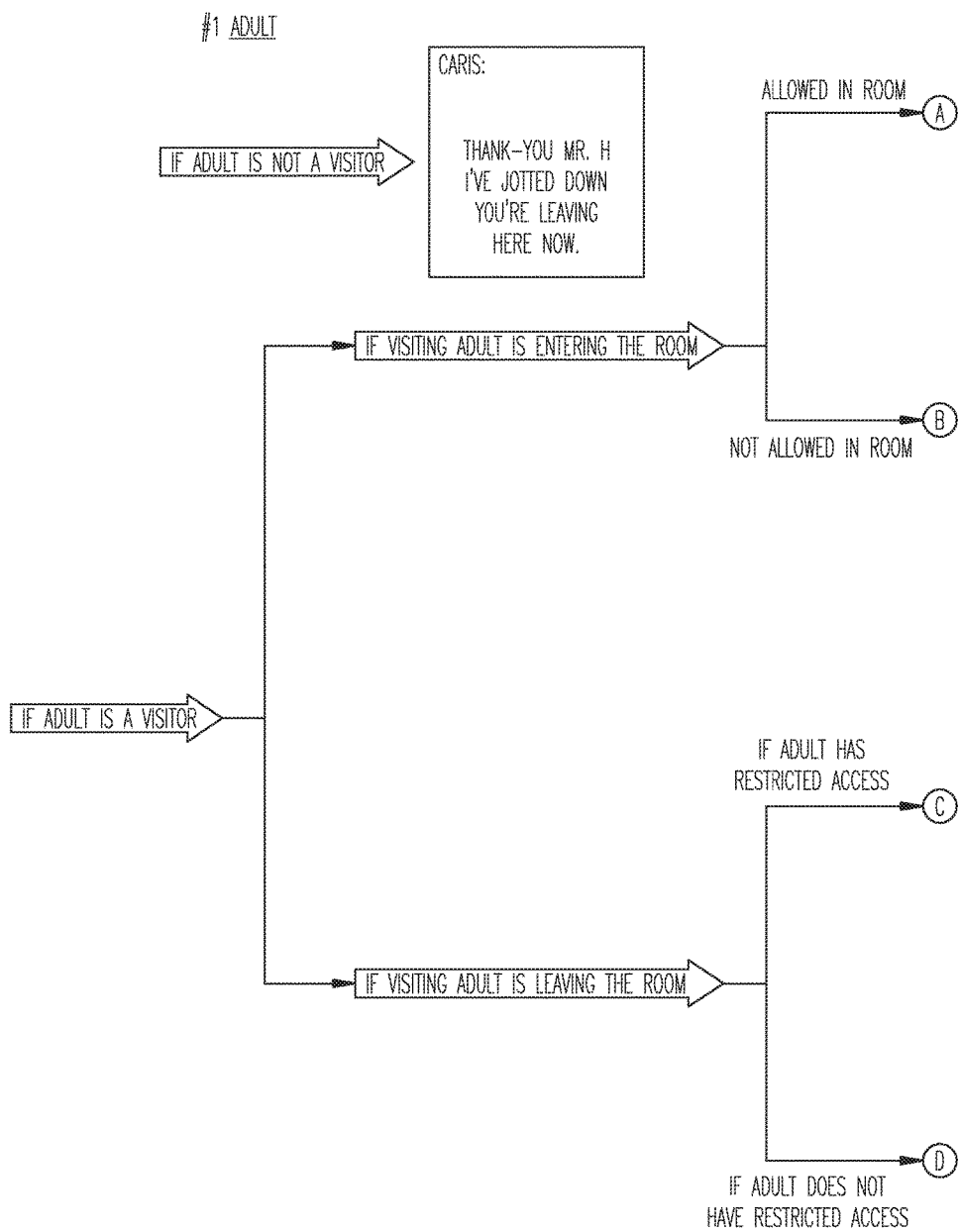
FIGS. 4A & 4B illustrate an example of an interaction flow between a system and a user of the system, according to various embodiments.
Figure 4B:
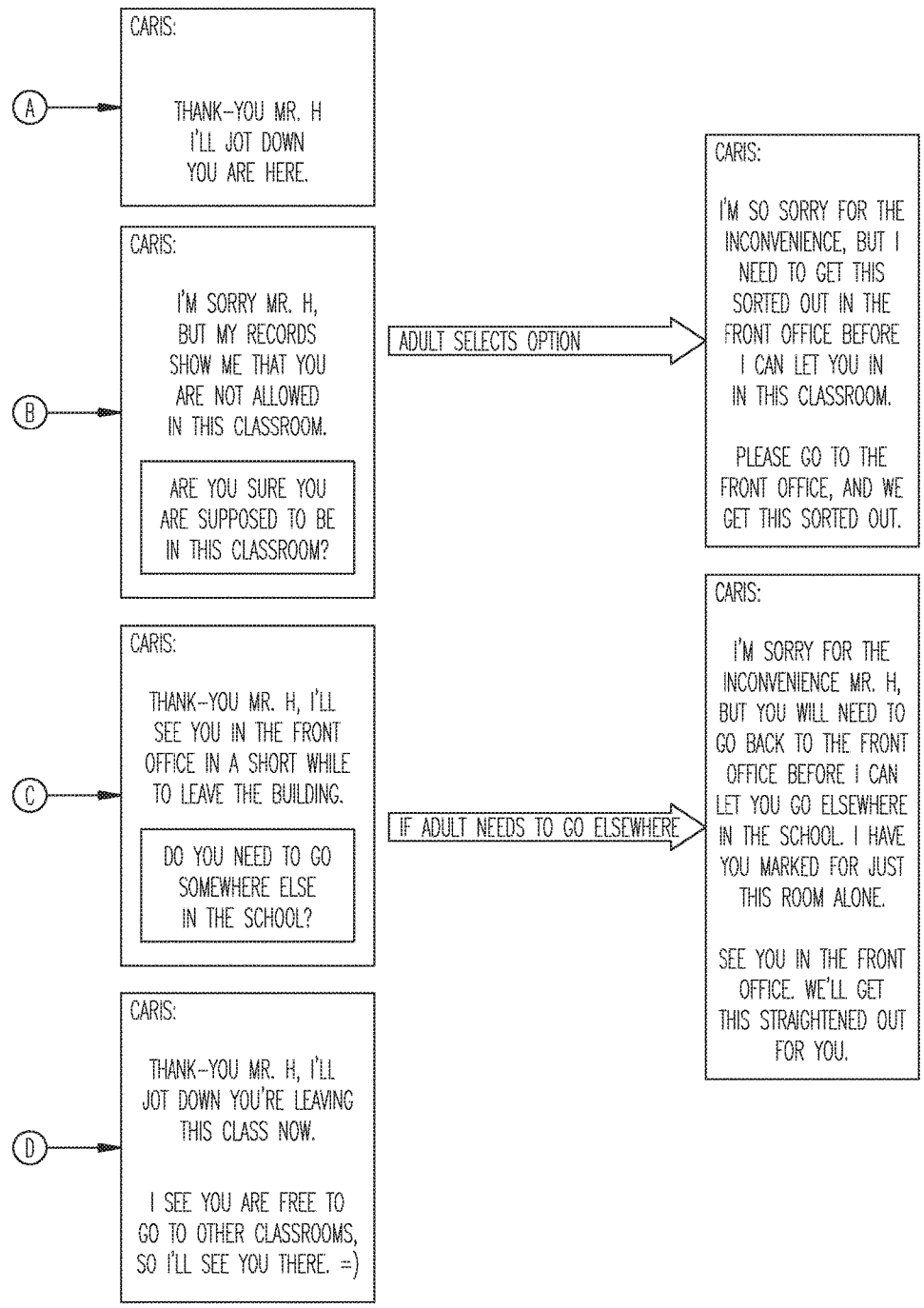

FIGS. 4A & 4B illustrate an example of an interaction flow between a system and a user of the system, according to various embodiments. FIG. 4A illustrates the initiation of the interaction flow. The interaction flow may be invoked by the system (e.g., the system 125 as described in FIG. 1) during an interaction between a person (e.g., object 105 as described in FIG. 1) and the system (e.g., when requesting access to a room, etc.). The system may determine whether the person is a visitor (e.g., a parent of a student, etc.) or is normally at the school (e.g., employee, teacher, administrator, etc.). If the person is not a visitor and is leaving the room the system may display an indication that a record has been made that the person is leaving the room.

If the person is a visitor, the system may determine if the person is entering the room or is leaving the room. If the visiting person is entering the room, the system may determine whether or not the person is allowed in the room. If the person is leaving the room, the system may determine whether or not the person has restricted access. The system may then follow path A, B, C, or D on FIG. 4B.

If the system determines that the person is allowed to enter the room, the system may follow path A and may display an indication that a record is being made that the person has arrived. If the system determines that the person is not allowed to enter the room, the system may follow path B and may display a message indicating that the person is not allowed in the room. The system may present the person with a user interface element that may be selected for challenging the denial of entry. Upon selection, the system may route the request to an administrator and may display an indication that the request will be further processed as well as directions to continue processing the request.

If the system determines that the person leaving the room has restricted access, the system may follow path C and may display a message indicating that the person may leave the room and may provide additional instructions for leaving the building. The system may provide a selectable user interface element that when selected provides the system with an indication that the person is requesting a route be created to another room. Upon section, the system may display a message providing instructions for completing processing of the request. If the system determines that the person leaving the room does not have restricted access, the system may follow path D and may display an indication that a record has been made that the person is leaving the room as well as an indication that the person may visit another room.

The interaction flow allows the system to prevent access to rooms based on the identity of the person attempting to enter a room and the identity of a person leaving a room. The system may use the interaction flow to provide the person with a way to interactively challenge an access request. Thus, errors in access control policies (e.g., through human error, etc.) may be remediated in real-time.

Figure 5A:
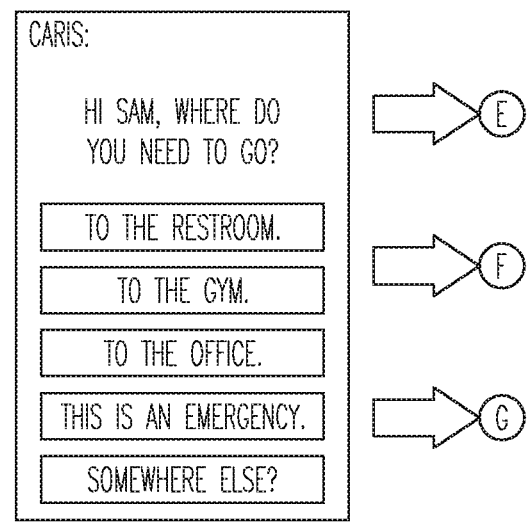
FIGS. 5A-5F illustrate an example of a series of interaction flows between a system and a user of the system leaving a room, according to various embodiments.
Figure 5B:
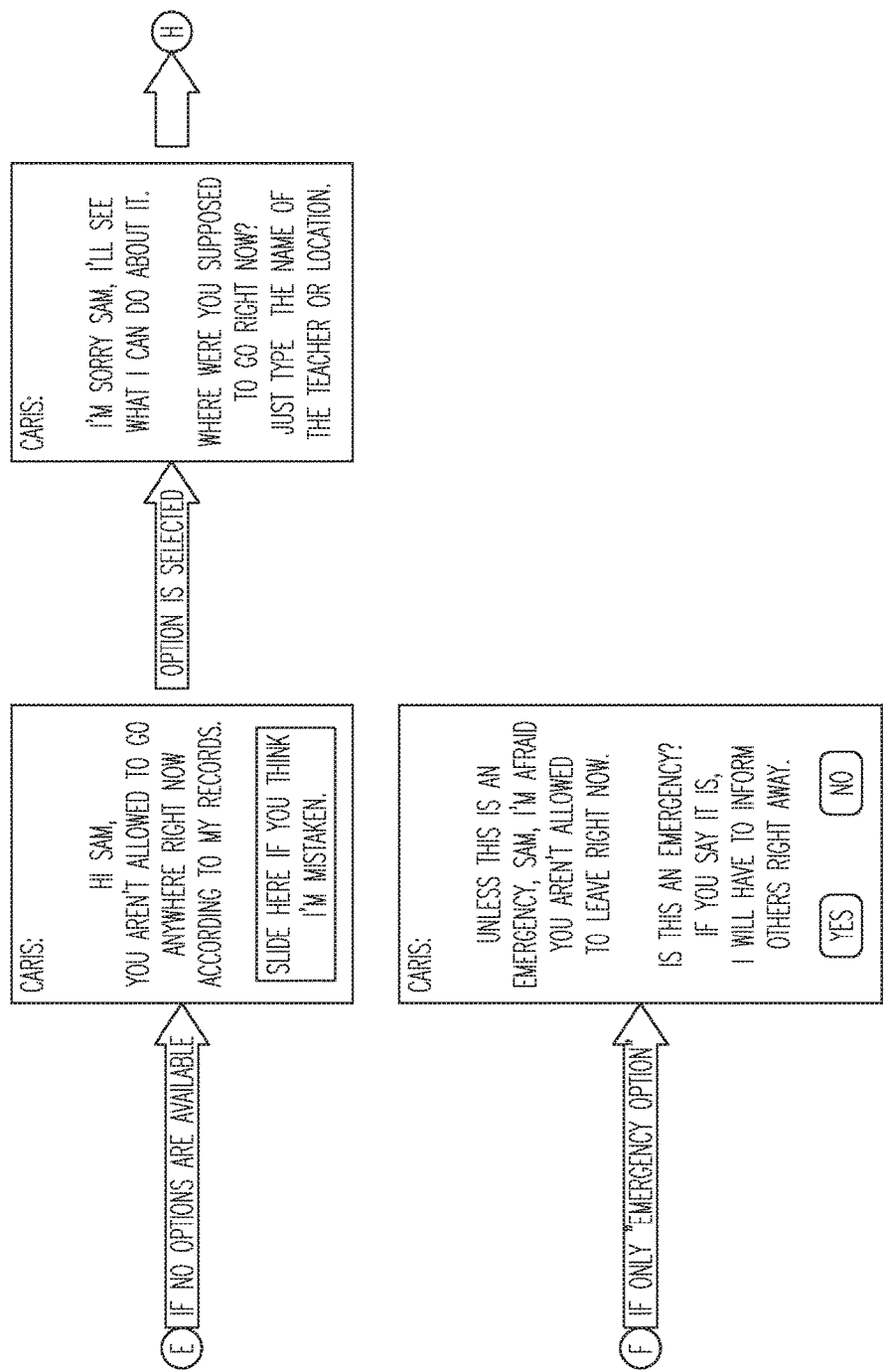
Figure 5C:
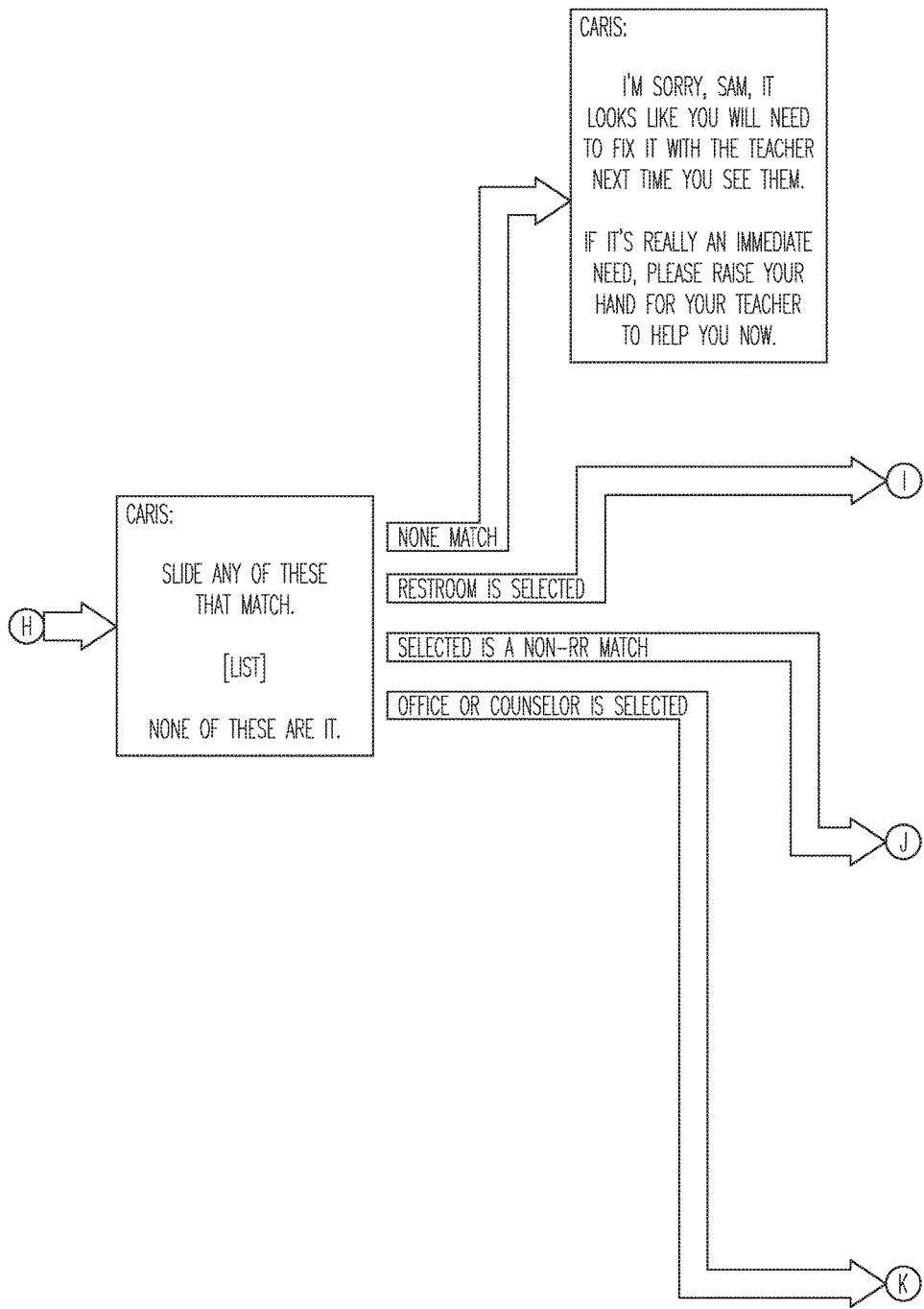

FIGS. 5A-5F illustrate an example of a series of interaction flows between a system and a user of the system leaving a room, according to various embodiments. FIG. 5A illustrates the initiation of the series of interaction flows. The series of interaction flows may be invoked by the system (e.g., the system 125 as described in FIG. 1) during an interaction between a person (e.g., object 105 as described in FIG. 1) and the system (e.g., when requesting access to a room, etc.). The system may display a list of locations to which the person may request to establish a pathway (e.g., based on pre-authorization, default options, etc.). In some examples, the system may not display a list of locations (e.g., no pre-authorized pathways exist, etc.) and may follow path E on FIG. 5B. If a list of locations is displayed by the system and selection of a location is detected, the system may follow path F on FIG. 5B or path G on FIG. 5E.

If the system does not display a list of locations the system may follow path E and may display an indication that the person is hot allowed to leave the room. The system may present a selectable user interface element that, upon selection, provides an indication that the request may be verified. The system may present an input field allowing the person to provide a requested destination. The system may then follow path H on FIG. 5C and may display a list of selectable locations corresponding to the input received in the input field and a selectable element that when selected indicates that none of the list items matches the person's request. If the system detects the selection of the element indicating none of the list items matched the request, the system may display instructions for further processing of the request.

Figure 5D:
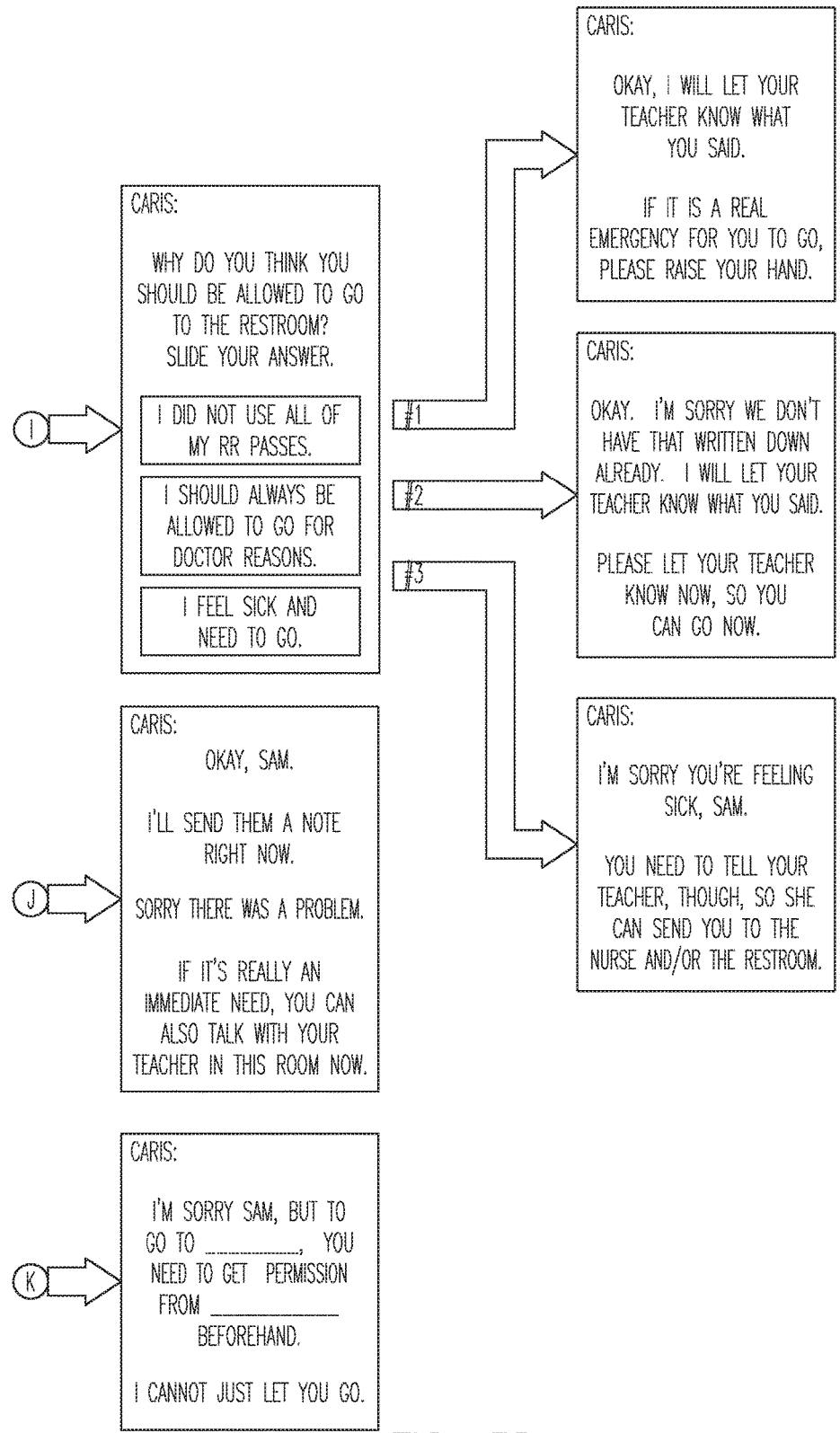

If the person selects a restroom as the destination, the system may follow path I on FIG. 5D and may display a list of selectable reasons that the person may be visiting the restroom. For example, the person may be able to select a reason of "I did not use all of my restroom passes" and the system may display an indication that the request will be forwarded to an administrator and may provide instructions for continued processing of the request in an emergency. In another example, the person may be able to select a reason of "I should always be allowed to go to the restroom for medical reasons" and the system may display an indication that the request will be forwarded to an administrator and may provide instructions for continued processing of the request. In another example, the person may be able to select a reason of "I feel sick and need to go to the restroom" and the system may display instruction for continuing processing of the request.

If the system detects that the person selected a location other than the restroom, the system may follow path J on FIG. 5D and may display an indication that the request will be forwarded to an administrator and may provide instructions for immediate processing of the request. In some examples, the system may follow path K on FIG. 5D (e.g., if the destination is an administrative office, counselor's office, etc.) and may display a message indicating that a pathway has not been created and instructions for establishing the pathway.

Figure 5E:
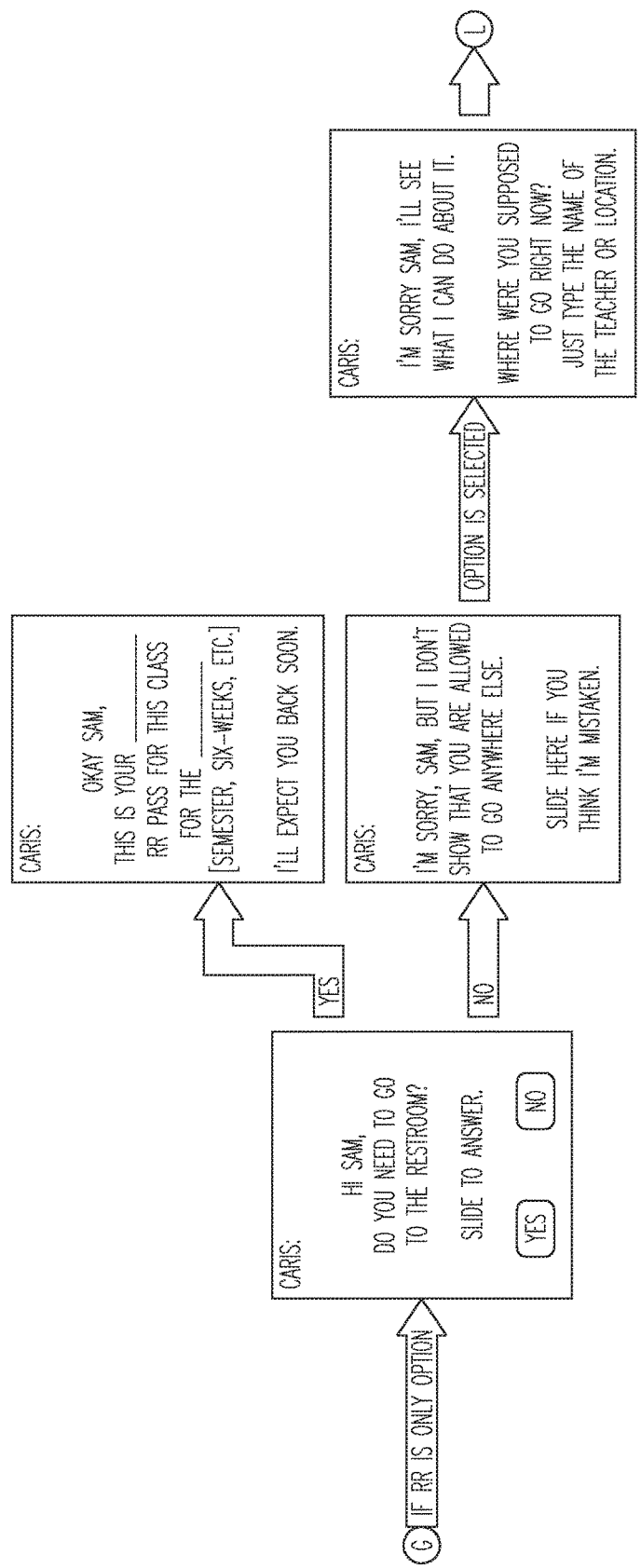
Figure 5F:
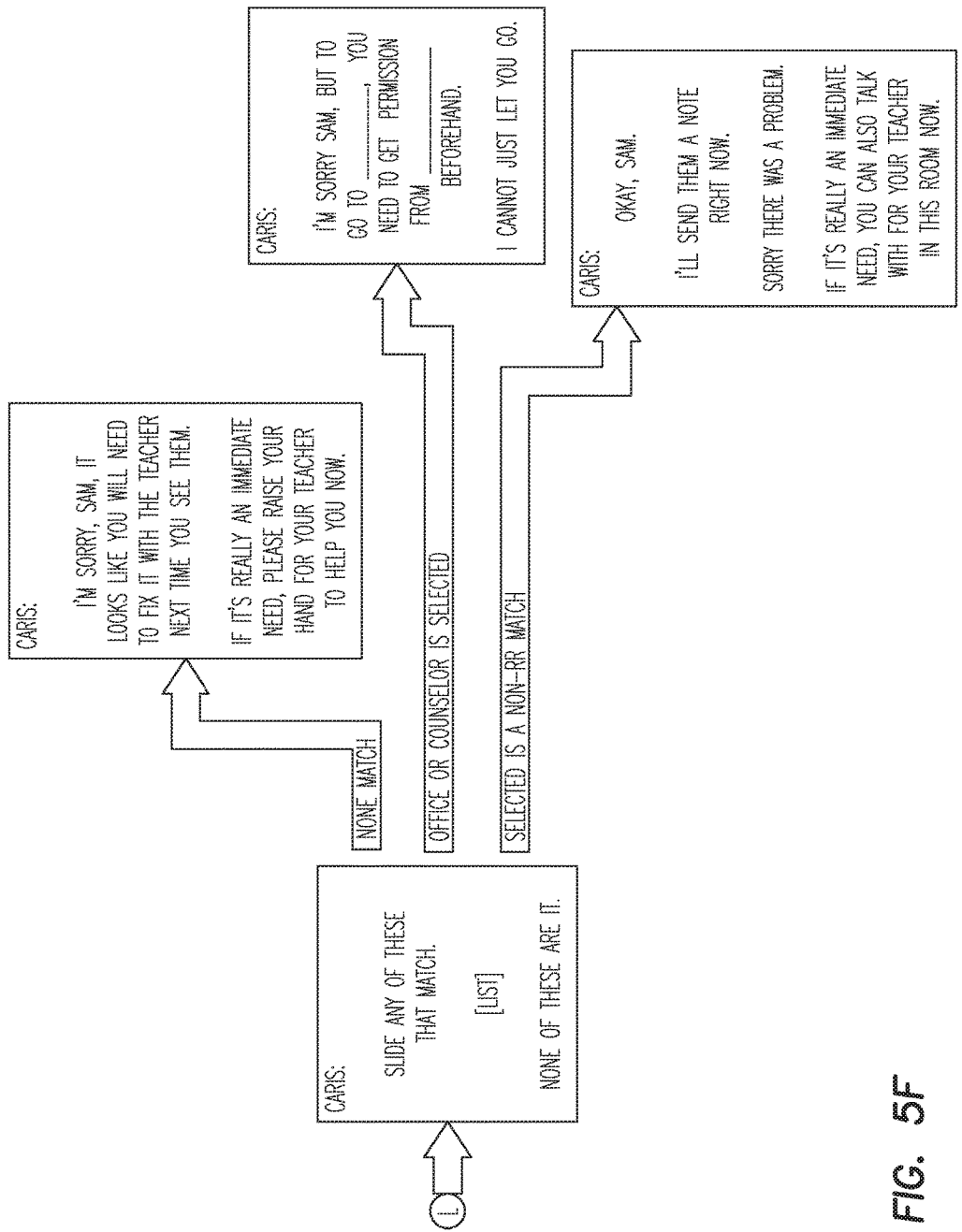

In some examples, the person may be allowed to establish a pathway to a designated destination (e.g., a restroom, etc.) based on a set of rules and the system may follow path G on FIG. 5E. The system may display a user interface requesting input indicating whether or not the person would like to establish a pathway to the designated destination. If the system detects that the person selected a positive response to the request the system may establish the pathway and may display an indication of how the current request has impacted future requests for a pathway tot eh designated destination. For example, the system may indicate that three requests for pathways to the destination remain for the next two weeks, etc.

If the system detects that the person selected a negative response to the request for input, the system may indicate that the person is not allowed to establish a pathway to another destination. The system may present a selectable user interface element that, upon selection, provides an indication that the request may be verified. The system may present an input field allowing the person to provide a requested destination. The system may then follow path L on FIG. 5F and may display a list of selectable locations corresponding to the input received in the input field and a selectable element that when selected indicates that none of the list items matches the person's request. If the system detects the selection of the element indicating none of the list items matched the request, the system may display instructions for further processing of the request.

If the system detects that the person selected a location other than a restroom, the system may display an indication that the request will be forwarded to an administrator and may provide instructions for immediate processing of the request. In some examples, the system may display a message indicating that a pathway has not been created and instructions for establishing the pathway (e.g., if the destination is an administrative office, counselor's office, etc.).

The series of interaction flows allow the system to prevent access to rooms based on the identity of the person attempting to travel to a destination from a current room. The system may use the series of interaction flows to provide the person with a way to interactively challenge an access request denial (e.g., failure to establish a pathway to a destination, etc.). Thus, errors in access control policies (e.g., through human error, etc.) may be remediated in real-time.

Figure 6A:
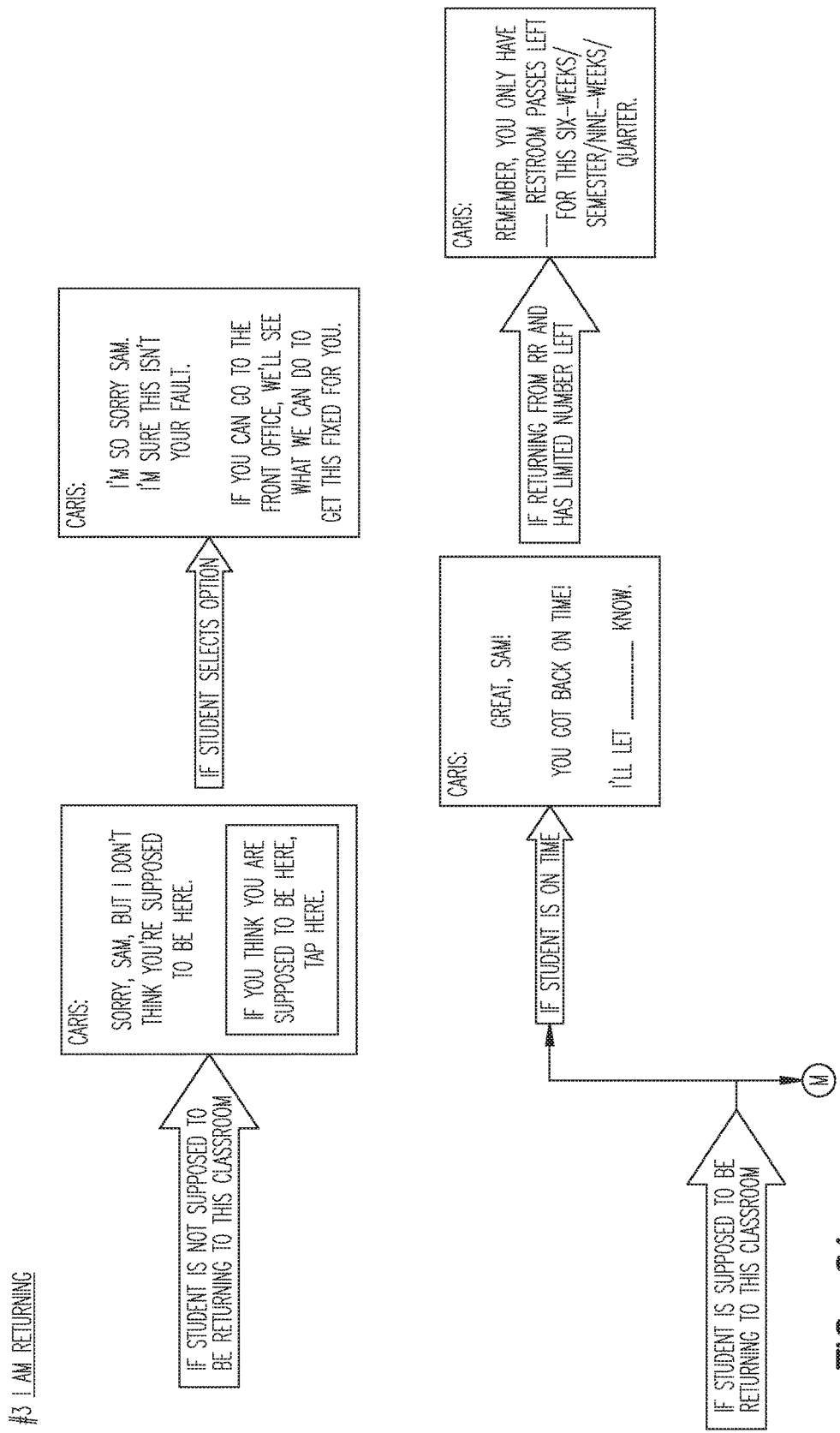
FIGS. 6A & 6B illustrate an example of an interaction flow between a system and a user of the system returning to a room, according to various embodiments.
Figure 6B:
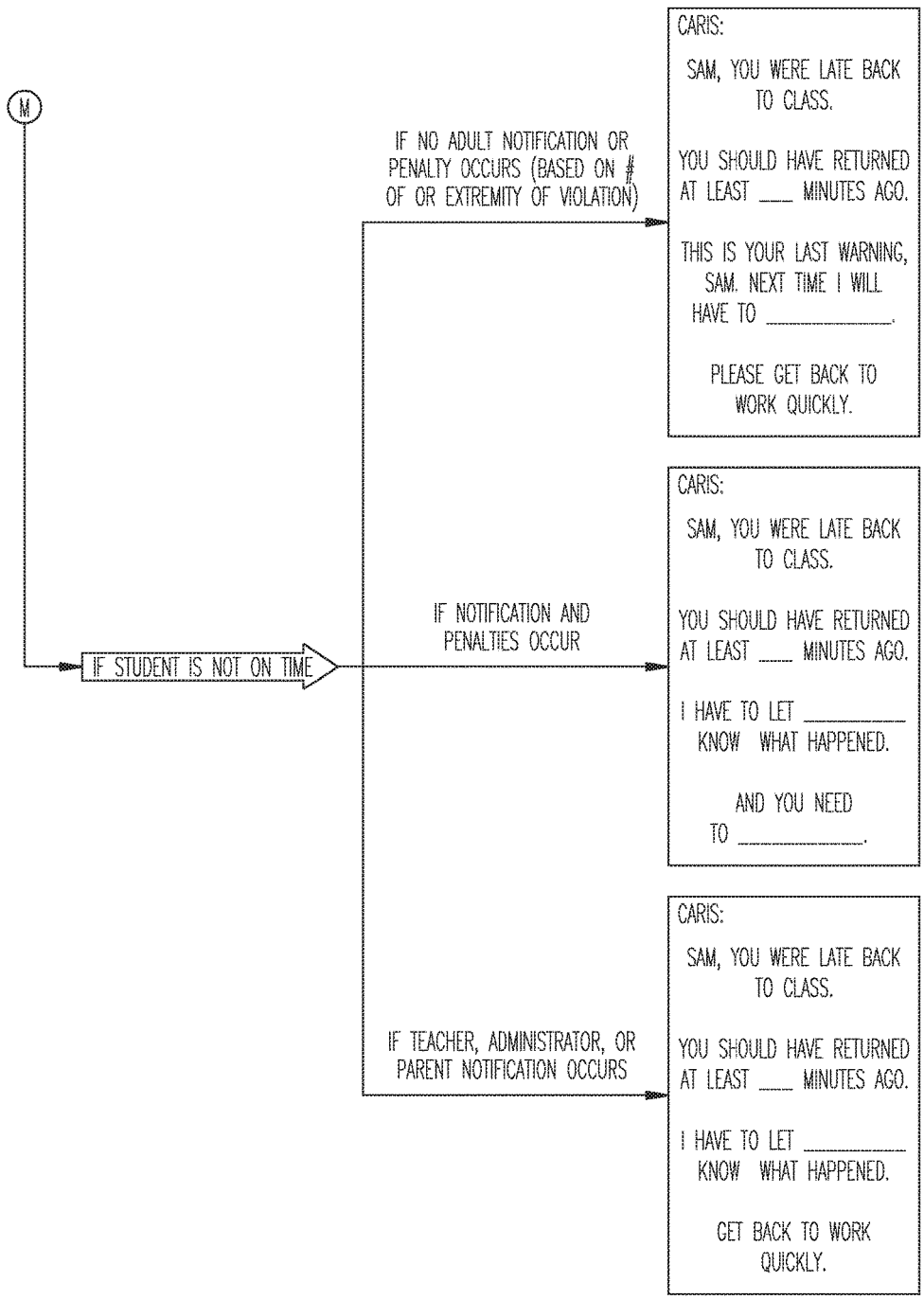

FIGS. 6A & 6B illustrate an example of an interaction flow between a system and a user of the system returning to a room, according to various embodiments. FIG. 6A illustrates the initiation of the interaction flow. The interaction flow may be invoked by the system (e.g., the system 125 as described in FIG. 1) during an interaction between a person (e.g., object 105 as described in FIG. 1) and the system (e.g., when requesting access to a room, etc.). The system may determine whether or not the person is allowed to pass through an access control feature (e.g., an access control feature of the variety of access control features 120 as described in FIG. 1, etc.).

If the system determines that the person is not allowed to pass through the access control feature, the system may display a message indicating the passage through the access control feature has been denied. The system may display a selectable user interface element that, upon selection, displays a message including instructions for continuing processing of the request to pass through the access control feature.

If the system determines that the person is allowed to pass through the access control feature, the system may determine if the person has arrived at the access control feature during an expected arrival time window. If the system determines the person has arrived during the time window, the system may display a message indicating that the person will be allowed through the access control feature and may actuate passage of the person through the access control feature. In some examples, the person may be returning from traveling to a specific destination based on a set of rules and the system may display an indication of how the completed trip impacted future requests to travel to the designated destination. For example, the system may display a message indicating that the person may request a pathway be established to a restroom three times in the next two weeks.

If the system determines that the person has not arrived at the access control feature during the arrival time window, the system may follow path M on FIG. 6B and the system may access a set of rules to determine information to be displayed to the person. For example, the system may determine that the circumstances (e.g., frequency, deviation between time window and arrival time, etc.) indicate that a warning should be displayed indicating how late the person has arrived and consequences for future late arrivals. The system may then allow the person passage through the access control feature.

In another example, the system may determine that the circumstances indicate that a notification should be transmitted to another person indicating that the person was late to arrive and may display an indication of how late the person has arrived and who will be notified of the late arrival. The system may then allow the person passage through the access control feature.

In another example, the system may determine that the circumstances indicate that the person faces penalties and may display an indication of how late the person has arrived, who will be notified of the late arrival, and actions that may need to be completed as a result of the late arrival (e.g., steps to be allowed passage through the access control feature, etc.).

The interaction flow may allow the system to prevent access to a room based on the identity of the person attempting to gain entry to the room. The system may use the interaction flow to provide the person with a way to interactively challenge an access request denial (e.g., failure to establish a pathway to a destination, etc.). Thus, errors in access control policies (e.g., through human error, etc.) may be remediated in real-time.

Figure 7:
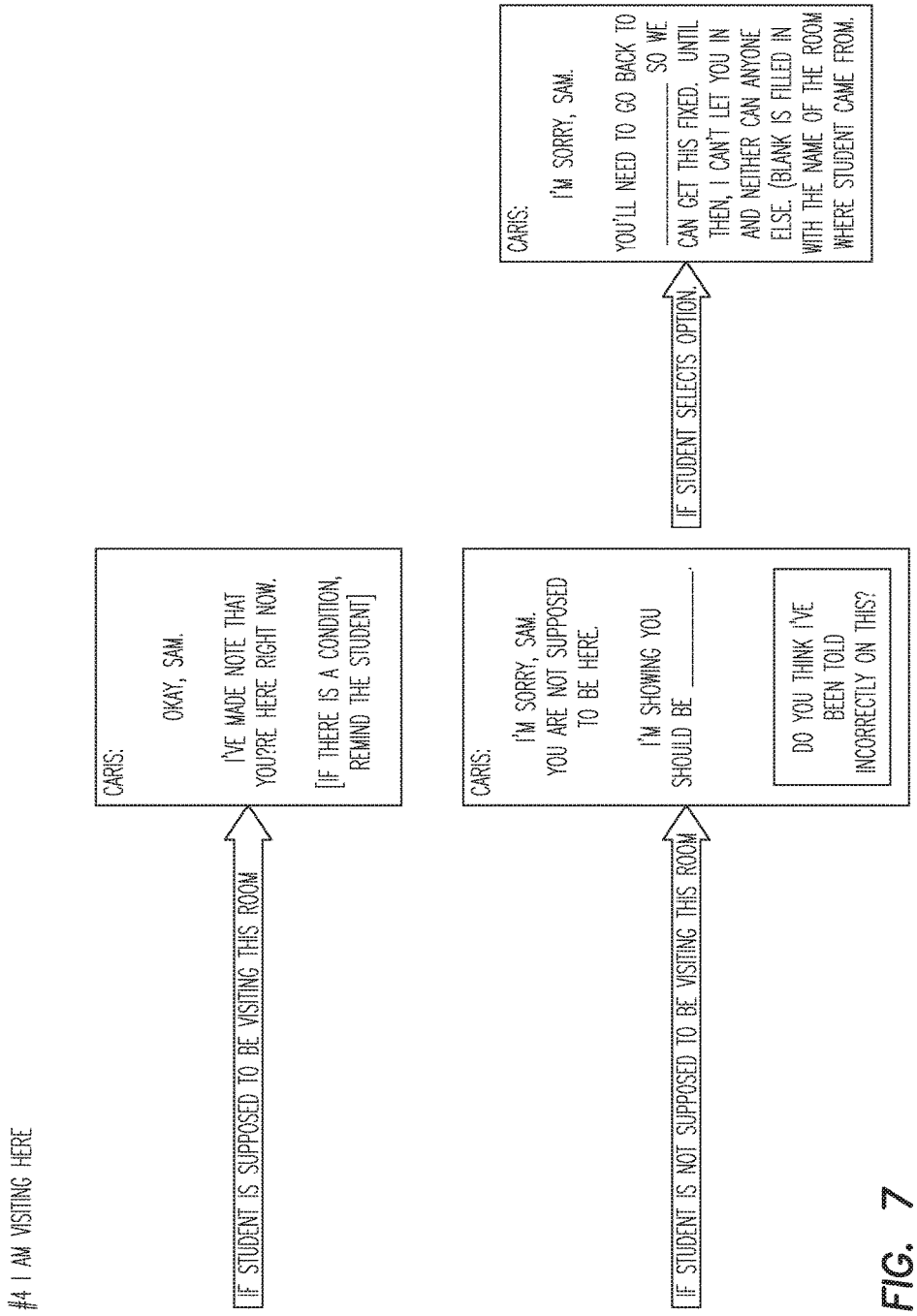
FIG. 7 illustrates an example of an interaction flow between a system and a room visitor, according to various embodiments.

FIG. 7 illustrates an example of an interaction flow between a system and a room visitor, according to various embodiments. The interaction flow may be invoked by the system (e.g., the system 125 as described in FIG. 1) during an interaction between a person (e.g., object 105 as described in FIG. 1) and the system (e.g., when requesting access to a room, etc.). The person may attempt to access a room and the system may determine whether or not the person is allowed to pass through an access control feature to gain access to the room.

If the system determines that the person is allowed to access the room, the system may establish a pathway through the access control feature, allow the person passage through the access control feature, and may display a message indicating that a record is being made of the person's arrival. In some examples, one or more conditions for access may be included in the message displayed by the system.

If the system determines that the person is not allowed to access the room, the pathway request may be denied and the system may display a message indicating that the request was denied. In some examples, the message may include an expected location of the person. The system may display a selectable user interface that, upon selection, cause the system to display a message including instructions for continued processing of the request.

The interaction flow may allow the system to prevent access to a room based on the identity of the person attempting enter the room. The system may use the interaction flow to provide the person with a way to interactively challenge an access request denial (e.g., failure to establish a pathway to a destination, etc.). Thus, errors in access control policies (e.g., through human error, etc.) may be remediated in real-time.

Figure 8:
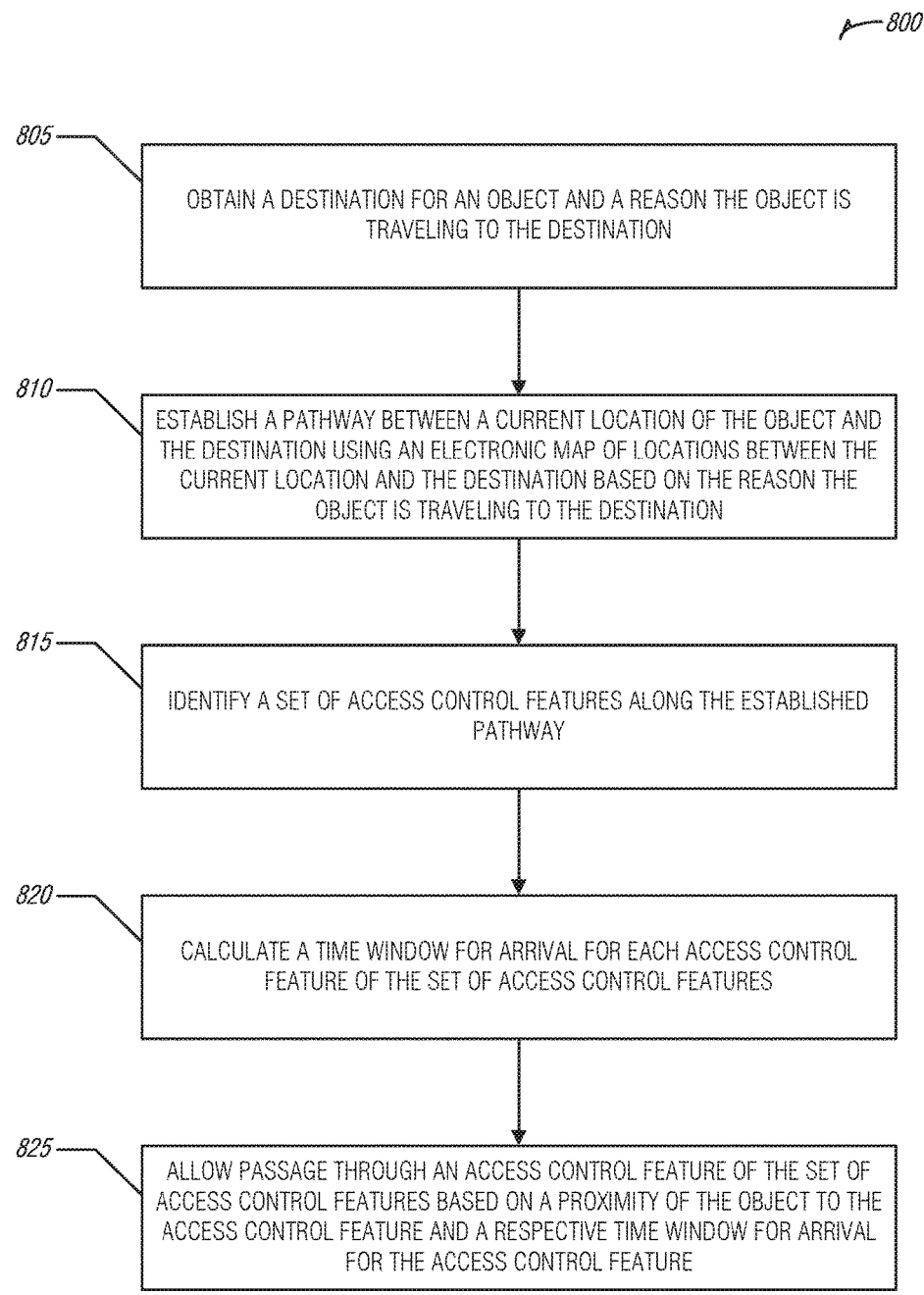
FIG. 8 illustrates a flowchart of an example of a method for intelligent pathway access control, according to various embodiments.

FIG. 8 illustrates a flowchart of an example of a method 800 for intelligent pathway access control, according to various embodiments. The method 800 may provide similar functionality to that described in FIG. 1.

At operation 805, a destination for an object and a reason the object is traveling to the destination may be obtained (e.g., using the transceiver 130 as described in FIG. 1). In an example, the destination and the reason the object is traveling to the destination may be obtained from a computing device (e.g., computing device 115 as described in FIG. 1) located on a first side of a first access control feature (e.g., an access control feature of the one or more access control features 120 as described in FIG. 1) of the set of access control features.

In some examples, a graphical user interface may be transmitted to a display device (e.g., a display device of the computing device 115 as described in FIG. 1). The graphical user interface may include a first interface window including a first selectable user interface element and a selection of the first selectable user interface element may be detected as a first input. The first input may be used to obtain the destination for the object. In some examples, the graphical user interface may include a second interface window including a second selectable user interface element and a selection of the second selectable user interface element may be detected as a second input. The second input may be used to obtain the reason the object is traveling to the destination. In some examples, the first input may be used to determine that the object is not allowed to travel to the destination and the destination may be altered based on the determination.

At operation 810, a pathway between a current location of the object and the destination may be established (e.g., using the pathway calculator 140 as described in FIG. 1) using an electronic map of locations between the current location and the destination based on the reason the object is traveling to the destination. In an example, a notification may be transmitted (e.g., using the transceiver 130 as described in FIG. 1) to one or more users including an identity of the object, the destination, and the reason and the pathway may be established in response to receiving a response to the notification. In an example, a user responsible for approving the reason the object is traveling to the destination may be determined. In an example, a set of prior responses from the user to reasons for traveling to a destination may be evaluated and the pathway may be established based on the evaluation. In an example, the reason the object is traveling to the destination may be compared to a repository of reasons and the pathway may be established based on the comparison. In an example, the repository of reasons may correspond to the object. In an example, the object may be identified in a room using computer vision and the current location of the object may be determined based on the identification of the object in the room.

At operation 815, a set of access control features may be identified (e.g., using the pathway calculator 140 as described in FIG. 1) along the established pathway. For example, a set of doors controlled with electronic lockset, electronic turnstiles, etc. may be identified which may be traversed by the object to travel from the current location to the destination.

At operation 820, a time window for arrival may be calculated (e.g., using the pathway calculator 140 as described in FIG. 1) for each access control feature of the set of access control features. For example, the pathway may include a first secure door, a second secure door, and a third secure door and it may be calculated that the object should arrive at the first secure door between 0 and 30 seconds after travel begins, at the second secure door 5 minutes to 6 minutes after travel begins, and at the third secure door 7 minutes to 9 minutes after travel begins.

At operation 825, the object may be allowed passage (e.g., using the security actuator 145 as described in FIG. 1) through an access control feature of the set of access control features based on a proximity of the object to the access control feature and a respective time window for arrival for the access control feature. In an example, it may be determined (e.g., using the security actuator 145 as described in FIG. 1) that the object is not in proximity to the access control feature of the set of access control features within a corresponding time window for arrival and in response a notification may be transmitted (e.g., using the transceiver 130 as described in FIG. 1) to one or more users (e.g., teacher, administrator, etc.). In an example, it may be determined that the object is in proximity to the access control object using image recognition (e.g., as describe in FIG. 2). In an example, the object may be allowed passage through the access control feature by activating (e.g., using the security actuator 145 as described in FIG. 1) an unlock function of an electronically controlled lockset (e.g., the electronic lockset 310 as described in FIG. 3).

Figure 9:
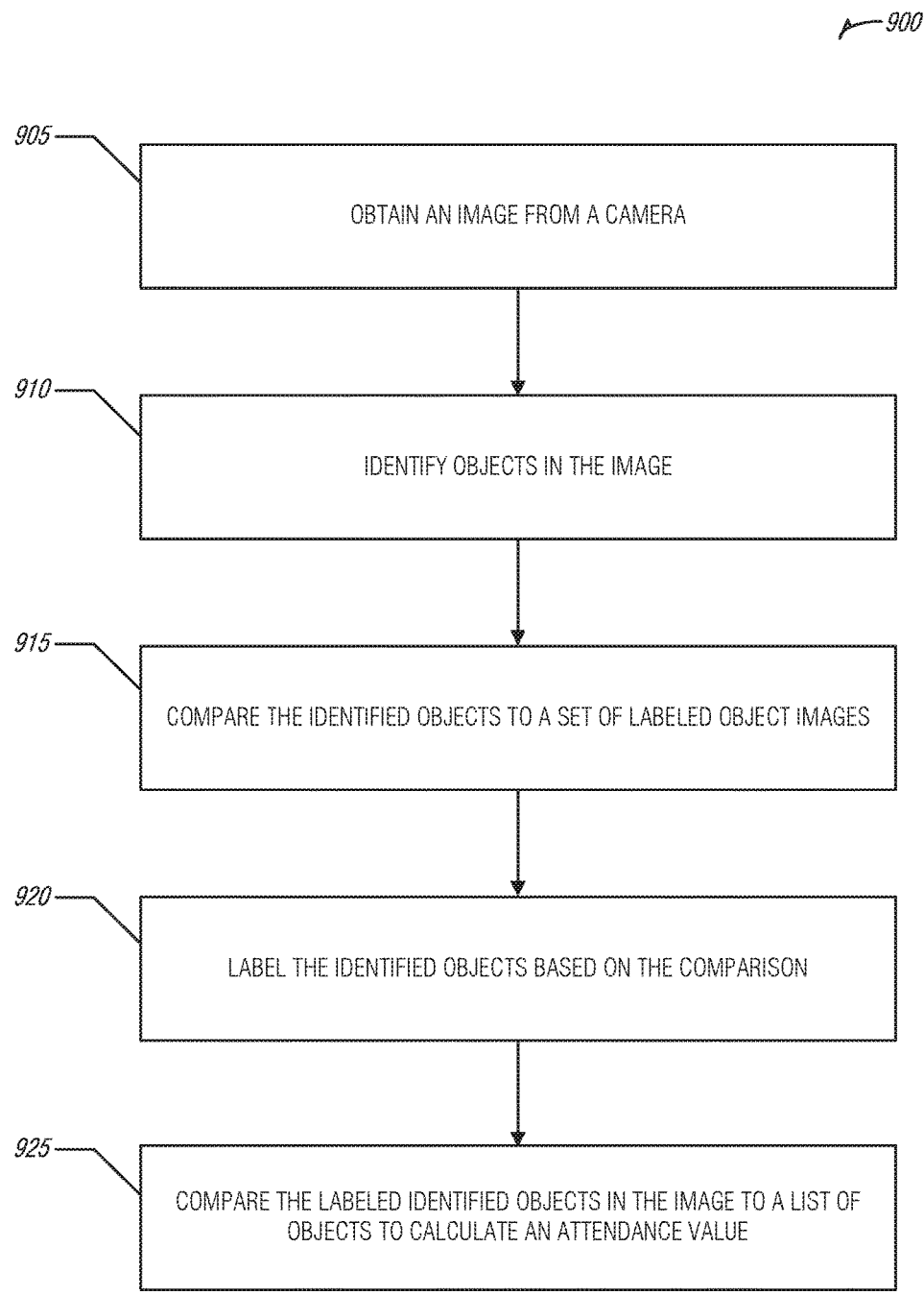
FIG. 9 illustrates a flowchart of an example of a method for intelligent pathway access control, according to various embodiments.

FIG. 9 illustrates a flowchart of an example of a method 900 for intelligent pathway access control, according to various embodiments. The method 900 may provide similar functionality to that described in FIG. 2.

At operation 905, an image may be obtained (e.g., using the transceiver 225 as described in FIG. 2) from a camera (e.g., the camera 210 as described in FIG. 2). For example, images may be obtained from the camera at intervals (or continuously) that contain objects present in the viewing range of the camera.

At operation 910, objects (e.g., people, items, etc.) in the image may be identified (e.g., using the imager 230 as described in FIG. 2). For example, the image may include a variety of objects and image elements may be respectively identified as an object. For example, there may be three people in the image and each person may be identified as an object.

At operation 915, the identified objects may be compared (e.g., using the comparator 235 as described in FIG. 2) to a set of labeled object images. In an example, the identified objects may be compared to a repository of labeled object images. For example, a person may be identified in the image and compared to a repository of images of people labeled with names.

At operation 920, the objects may be labeled (e.g., using the comparator 235 as described in FIG. 2) based on the comparison between the identified objects in the image and the set of labeled object images. For example, the person identified in the image may be matched to an image of a person labeled with the name Lisa Sampson and the object may be labeled as Lisa Sampson.

At operation 925, the labeled identified objects in the image may be compared (e.g., using the calculator 240 as described in FIG. 2) to a list of objects to calculate an attendance value. In an example, the labeled identified objects may be compared to a student list for a classroom. For example, the object labeled as Lisa Sampson may be compared to a student list for a chemistry classroom corresponding to a time period and a presence value of 1 may be assigned to a list entry for Lisa Sampson. In an example, the attendance value may be calculated by summing a set of presence values for a set of objects included in the object list. For example, Lisa Sampson may have a presence value of 1, Marsha Bradley may have a presence value of 0, and John Doe may have a presence value of 1 and the attendance value may be calculated as 2.

Figure 10:
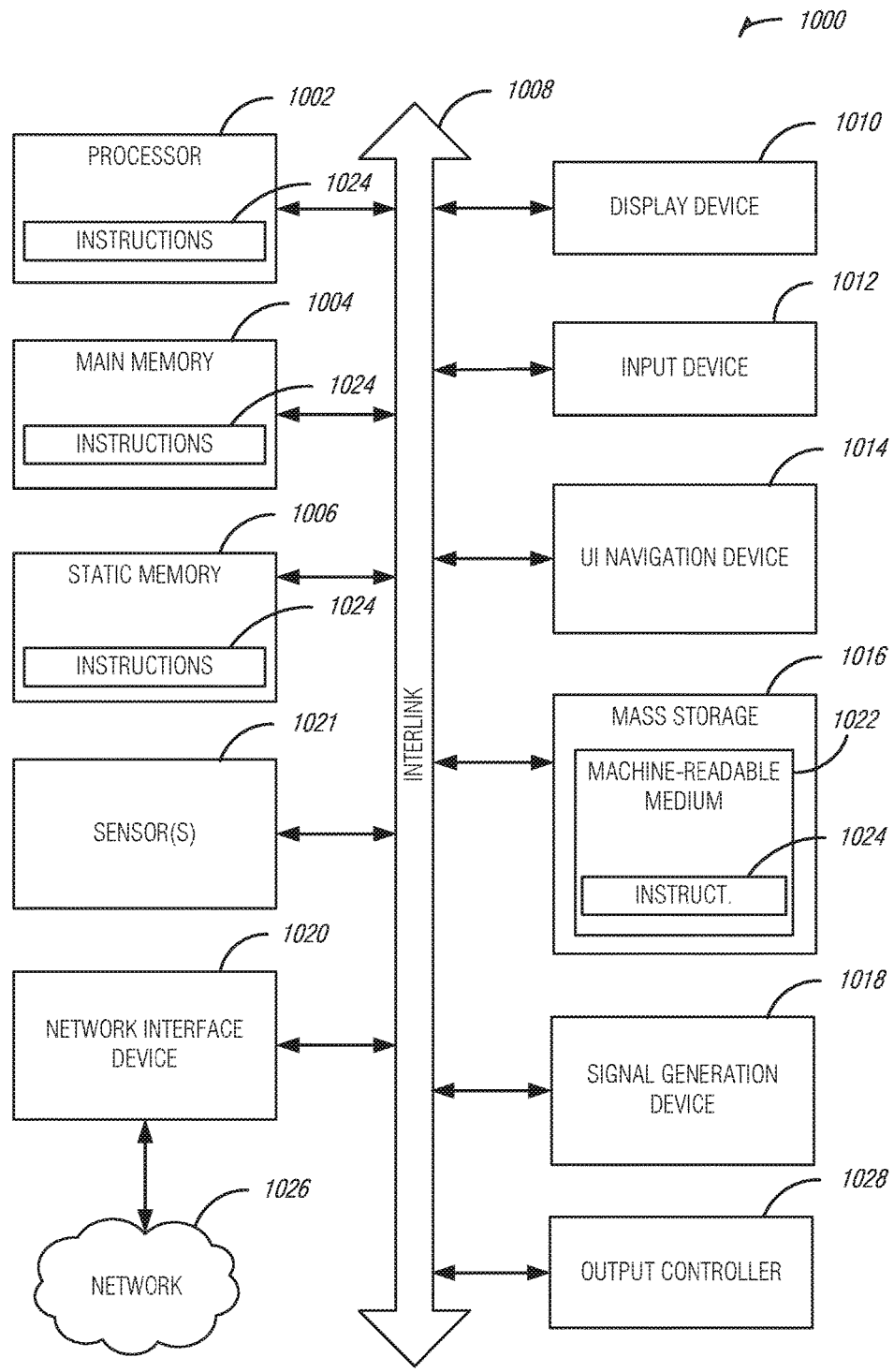
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

EXAMPLES

Example 1 is a system for intelligent pathway access control, the system comprising: at least one processor; and a memory including instructions that, when executed by the at least one processor, cause the at least one processor to perform operations to: obtain a destination for an object and a reason the object is traveling to the destination; establish a pathway between a current location of the object and the destination using an electronic map of locations between the current location and the destination based on the reason the object is traveling to the destination; identify a set of access control features along the established pathway; calculate a time window for arrival for each access control feature of the set of access control features; and allow the object passage through an access control feature of the set of access control features based on a proximity of the object to the access control feature and a respective time window for arrival for the access control feature.

In Example 2, the subject matter of Example 1 optionally includes instructions that cause the at least one processor to perform operations to: determine that the object is not in proximity to the access control feature of the set of access control features within a corresponding time window for arrival; and in response to the determination, transmit a notification to one or more users.

In Example 3, the subject matter of any one or more of Examples 1-2 optionally include instructions that cause the at least one processor to perform operations to: transmit a notification to one or more users including an identity of the object, the destination, and the reason; and in response to receipt of a response to the notification, establish the pathway.

In Example 4, the subject matter of any one or more of Examples 1-3 optionally include instructions that cause the at least one processor to perform operations to: determine a user responsible for approving the reason the object is traveling to the destination; evaluate a set of prior responses from the user to reasons for traveling to a destination; and establish the pathway based on the evaluation.

In Example 5, the subject matter of any one or more of Examples 1-4 optionally include instructions that cause the at least one processor to perform operations to: compare the reason the object is traveling to the destination to a repository of reasons; and establish the pathway based on the comparison.

In Example 6, the subject matter of Example 5 optionally includes wherein the repository of reasons corresponds to the object.

In Example 7, the subject matter of any one or more of Examples 1-6 optionally include instructions that cause the at least one processor to perform operations to: determine that the object is in proximity to the access control object using image recognition.

In Example 8, the subject matter of any one or more of Examples 1-7 optionally include wherein the instructions to allow passage through the access control feature further comprise instructions that cause the at least one processor to perform operations to: activate an unlock function of an electronically controlled lockset.

In Example 9, the subject matter of any one or more of Examples 1-8 optionally include wherein the destination and the reason the object is traveling to the destination are obtained from a computing device located on a first side of a first access control feature of the set of access control features.

In Example 10, the subject matter of any one or more of Examples 1-9 optionally include instructions that cause the at least one processor to perform operations to: identify the object in a room using computer vision; and determine the current location of the object based on the identification of the object in the room.

In Example 11, the subject matter of any one or more of Examples 1-10 optionally include instructions that cause the at least one processor to perform operations to: transmit a graphical user interface to a display device, the graphical user interface including a first interface window including a first selectable user interface element; detect a selection of the first selectable user interface element as a first input, wherein the first input is used to obtain the destination for the object.

In Example 12, the subject matter of Example 11 optionally includes wherein the graphical user interface further includes a second interface window including a second selectable user interface element; and further comprising instructions that cause the at least one processor to perform operations to: detect a selection of the second selectable user interface element as a second input, wherein the second input is used to obtain the reason the object is traveling to the destination.

In Example 13, the subject matter of any one or more of Examples 11-12 optionally include instructions that cause the at least one processor to perform operations to: determine that the destination is not allowed for the object using the first input; and alter the destination based on the determination.

In Example 14, the subject matter of any one or more of Examples 11-13 optionally include instructions that cause the at least one processor to perform operations to: determine that the destination is not allowed for the object using the first input; transmit a message to a user that the destination is not allowed, wherein the pathway is established between the current location of the object and the destination in response to receipt of a response to the message.

Example 15 is at least one machine readable medium including instructions for intelligent pathway access control that, when executed by a machine, cause the machine to perform operations to: obtain a destination for an object and a reason the object is traveling to the destination; establish a pathway between a current location of the object and the destination using an electronic map of locations between the current location and the destination based on the reason the object is traveling to the destination; identify a set of access control features along the established pathway; calculate a time window for arrival for each access control feature of the set of access control features; and allow the object passage through an access control feature of the set of access control features based on a proximity of the object to the access control feature and a respective time window for arrival for the access control feature.

In Example 16, the subject matter of Example 15 optionally includes instructions that cause the machine to perform operations to: determine that the object is not in proximity to the access control feature of the set of access control features within a corresponding time window for arrival; and in response to the determination, transmit a notification to one or more users.

In Example 17, the subject matter of any one or more of Examples 15-16 optionally include instructions that cause the machine to perform operations to: transmit a notification to one or more users including an identity of the object, the destination, and the reason; and in response to receipt of a response to the notification, establish the pathway.

In Example 18, the subject matter of any one or more of Examples 15-17 optionally include instructions that cause the machine to perform operations to: determine a user responsible for approving the reason the object is traveling to the destination; evaluate a set of prior responses from the user to reasons for traveling to a destination; and establish the pathway based on the evaluation.

In Example 19, the subject matter of any one or more of Examples 15-18 optionally include instructions that cause the machine to perform operations to: compare the reason the object is traveling to the destination to a repository of reasons; and establish the pathway based on the comparison.

In Example 20, the subject matter of Example 19 optionally includes wherein the repository of reasons corresponds to the object.

In Example 21, the subject matter of any one or more of Examples 15-20 optionally include instructions that cause the machine to perform operations to: determine that the object is in proximity to the access control object using image recognition.

In Example 22, the subject matter of any one or more of Examples 15-21 optionally include wherein the instructions to allow passage through the access control feature further comprise instructions that cause the machine to perform operations to: activate an unlock function of an electronically controlled lockset.

In Example 23, the subject matter of any one or more of Examples 15-22 optionally include wherein the destination and the reason the object is traveling to the destination are obtained from a computing device located on a first side of a first access control feature of the set of access control features.

In Example 24, the subject matter of any one or more of Examples 15-23 optionally include instructions that cause the machine to perform operations to: identify the object in a room using computer vision; and determine the current location of the object based on the identification of the object in the room.

In Example 25, the subject matter of any one or more of Examples 15-24 optionally include instructions that cause the machine to perform operations to: transmit a graphical user interface to a display device, the graphical user interface including a first interface window including a first selectable user interface element; detect a selection of the first selectable user interface element as a first input, wherein the first input is used to obtain the destination for the object.

In Example 26, the subject matter of Example 25 optionally includes wherein the graphical user interface further includes a second interface window including a second selectable user interface element; and further comprising instructions that cause the at least one processor to perform operations to: detect a selection of the second selectable user interface element as a second input, wherein the second input is used to obtain the reason the object is traveling to the destination.

In Example 27, the subject matter of any one or more of Examples 25-26 optionally include instructions that cause the machine to perform operations to: determine that the destination is not allowed for the object using the first input; and alter the destination based on the determination.

In Example 28, the subject matter of any one or more of Examples 25-27 optionally include instructions that cause machine to perform operations to: determine that the destination is not allowed for the object using the first input; transmit a message to a user that the destination is not allowed, wherein the pathway is established between the current location of the object and the destination in response to receipt of a response to the message.

Example 29 is a method for intelligent pathway access control, the method comprising: obtaining a destination for an object and a reason the object is traveling to the destination; establishing a pathway between a current location of the object and the destination using an electronic map of locations between the current location and the destination based on the reason the object is traveling to the destination; identifying a set of access control features along the established pathway; calculating a time window for arrival for each access control feature of the set of access control features; and allowing the object passage through an access control feature of the set of access control features based on a proximity of the object to the access control feature and a respective time window for arrival for the access control feature.

In Example 30, the subject matter of Example 29 optionally includes determining that the object is not in proximity to the access control feature of the set of access control features within a corresponding time window for arrival; and in response to the determining, transmitting a notification to one or more users.

In Example 31, the subject matter of any one or more of Examples 29-30 optionally include transmitting a notification to one or more users including an identity of the object, the destination, and the reason; and in response to receiving a response to the notification, establishing the pathway.

In Example 32, the subject matter of any one or more of Examples 29-31 optionally include determining a user responsible for approving the reason the object is traveling to the destination; evaluating a set of prior responses from the user to reasons for traveling to a destination; and establishing the pathway based on the evaluation.

In Example 33, the subject matter of any one or more of Examples 29-32 optionally include comparing the reason the object is traveling to the destination to a repository of reasons; and establishing the pathway based on the comparison.

In Example 34, the subject matter of Example 33 optionally includes wherein the repository of reasons corresponds to the object.

In Example 35, the subject matter of any one or more of Examples 29-34 optionally include determining that the object is in proximity to the access control object using image recognition.

In Example 36, the subject matter of any one or more of Examples 29-35 optionally include wherein allowing passage through the access control feature includes activating an unlock function of an electronically controlled lockset.

In Example 37, the subject matter of any one or more of Examples 29-36 optionally include wherein the destination and the reason the object is traveling to the destination are obtained from a computing device located on a first side of a first access control feature of the set of access control features.

In Example 38, the subject matter of any one or more of Examples 29-37 optionally include identifying the object in a room using computer vision; and determining the current location of the object based on the identifying of the object in the room.

In Example 39, the subject matter of any one or more of Examples 29-38 optionally include transmitting a graphical user interface to a display device, the graphical user interface including a first interface window including a first selectable user interface element; detecting a selection of the first selectable user interface element as a first input, wherein the first input is used in obtaining the destination for the object.

In Example 40, the subject matter of Example 39 optionally includes wherein the graphical user interface further includes a second interface window including a second selectable user interface element; and further comprising: detecting a selection of the second selectable user interface element as a second input, wherein the second input is used in obtaining the reason the object is traveling to the destination.

In Example 41, the subject matter of any one or more of Examples 39-40 optionally include determining that the destination is not allowed for the object using the first input; and altering the destination based on the determination.

In Example 42, the subject matter of any one or more of Examples 39-41 optionally include determining that the destination is not allowed for the object using the first input; and transmitting a message to a user that the destination is not allowed, wherein establishing the pathway between the current location of the object and the destination is in response to receiving a response to the message.

What is claimed is:

1. A system for intelligent pathway access control, the system comprising:
    at least one processor; and
    a memory including instructions that, when executed by the at least one processor, cause the at least one processor to perform operations to:
        obtain a destination for an object and a reason the object s traveling to the destination;
        compare a rule model to the destination, an identity of the object, and the reason, wherein the rule model includes rule preferences determined based on prior authorization request responses for the reason;
        establish a pathway between a current location of the object and the destination using an electronic map of locations between the current location and the destination based the results of the comparison;
        identify a set of access control features along the established pathway;
        calculate a time window for arrival for each access control feature of the set of access control features; and
        allow the object passage through an access control feature of the set of access control features based on a proximity of the object to the access control feature and a respective time window for arrival for the access control feature.

2. The system of claim 1, further comprising instructions that cause the at least one processor to perform operations to:
    determine that the object is not in proximity to the access control feature of the set of access control features within a corresponding time window for arrival; and
    in response to the determination, transmit a notification to one or more users.

3. The system of claim 1, further comprising instructions that cause the at least one processor to perform operations to:
    transmit a notification to one or more users including an identity of the object, the destination, and the reason; and
    in response to receipt of a response to the notification, establish the pathway.

4. The system of claim 1, further comprising instructions that cause the at least one processor to perform operations to:
    determine a user responsible for approving the reason the object is traveling to the destination;
    evaluate a set of prior responses from the user to reasons for traveling to a destination; and
    establish the pathway based on the evaluation.

5. The system of claim 1, further comprising instructions that cause the at least one processor to perform operations to:
    compare the reason the object is traveling to the destination to a repository of reasons; and
    establish the pathway based on the comparison.

6. The system of claim 5, wherein the repository of reasons corresponds to the object.

7. The system of claim 1, further comprising instructions that cause the at least one processor to perform operations to:
    determine that the object is in proximity to the access control object using image recognition.

8. The system of claim 1, wherein the instructions to allow passage through the access control feature further comprise instructions that cause the at least one processor to perform operations to:
    activate an unlock function of an electronically controlled lockset.

9. The system of claim 1, wherein the destination and the reason the object is traveling to the destination are obtained from a computing device located on a first side of a first access control feature of the set of access control features.

10. The system of claim 1, further comprising instructions that cause the at least one processor to perform operations to:
    identify the object in a room using computer vision; and
    determine the current location of the object based on the identification of the object in the room.

11. The system of claim 1, further comprising instructions that cause the at least one processor to perform operations to:
    transmit a graphical user interface to a display device, the graphical user interface including a first interface window including a first selectable user interface element; and
    detect a selection of the first selectable user interface element as a first input, wherein the first input is used to obtain the destination for the object.

12. The system of claim 11, wherein the graphical user interface further includes a second interface window including a second selectable user interface element; and further comprising instructions that cause the at least one processor to perform operations to:
    detect a selection of the second selectable user interface element as a second input, wherein the second input is used to obtain the reason the object is traveling to the destination.

13. The system of claim 11, further comprising instructions that cause the at least one processor to perform operations to:

determine that the destination is not allowed for the object using the first input; and alter the destination based on the determination.

14. The system of claim 11, further comprising instructions that cause the at least one processor to perform operations to:

determine that the destination is not allowed for the object using the first input; and transmit a message to a user that the destination is not allowed, wherein the pathway is established between the current location of the object and the destination in response to receipt of a response to the message.

15. At least one non-transitory machine readable medium including instructions for intelligent pathway access control that, when executed by a machine, cause the machine to perform operations to:

obtain a destination for an object and a reason the object is traveling to the destination;

compare a rule model to the destination, an identity of the object, and the reason, wherein the rule model includes rule preferences determined based on prior authorization request responses for the reason;

establish a pathway between a current location of the object and the destination using an electronic map of locations between the current location and the destination based on the results of the comparison;

identify a set of access control features along the established pathway;

calculate a time window for arrival for each access control feature of the set of access control features; and allow the object passage through an access control feature of the set of access control features based on a proximity of the object to the access control feature and a respective time window for arrival for the access control feature.

16. The at least one machine readable medium of claim 15, further comprising instructions that cause the machine to perform operations to:

determine that the object is not in proximity to the access control feature of the set of access control features within a corresponding time window for arrival; and in response to the determination, transmit a notification to one or more users.

17. The at least one machine readable medium of claim 15, further comprising instructions that cause the machine to perform operations to:

transmit a notification to one or more users including an identity of the object, the destination, and the reason; and in response to receipt of a response to the notification, establish the pathway.

18. The at least one machine readable medium of claim 15, further comprising instructions that cause the machine to perform operations to:

determine a user responsible for approving the reason the object is traveling to the destination;

evaluate a set of prior responses from the user to reasons for traveling to a destination; and establish the pathway based on the evaluation.

19. The at least one machine readable medium of claim 15, further comprising instructions that cause the machine to perform operations to:

compare the reason the object is traveling to the destination to a repository of reasons; and establish the pathway based on the comparison.

20. The at least one machine readable medium of claim 19, wherein the repository of reasons corresponds to the object.

21. The at least one machine readable medium of claim 15, further comprising instructions that cause the machine to perform operations to:

determine that the object is in proximity to the access control object using image recognition.

22. The at least one machine readable medium of claim 15, wherein the instructions to allow passage through the access control feature further comprise instructions that cause the machine to perform operations to:

activate an unlock function of an electronically controlled lockset.

23. The at least one machine readable medium of claim 15, wherein the destination and the reason the object is traveling to the destination are obtained from a computing device located on a first side of a first access control feature of the set of access control features.

24. The at least one machine readable medium of claim 15, further comprising instructions that cause the machine to perform operations to:

identify the object in a room using computer vision; and determine the current location of the object based on the identification of the object in the room.

25. The at least one machine readable medium of claim 15, further comprising instructions that cause the machine to perform operations to:

transmit a graphical user interface to a display device, the graphical user interface including a first interface window including a first selectable user interface element; and detect a selection of the first selectable user interface element as a first input, wherein the first input is used to obtain the destination for the object.

26. The at least one machine readable medium of claim 25, wherein the graphical user interface further includes a second interface window including a second selectable user interface element; and further comprising instructions that cause the at least one processor to perform operations to:

detect a selection of the second selectable user interface element as a second input, wherein the second input is used to obtain the reason the object is traveling to the destination.

27. The at least one machine readable medium of claim 25, further comprising instructions that cause the machine to perform operations to:

determine that the destination is not allowed for the object using the first input; and alter the destination based on the determination.

28. The at least one machine readable medium of claim 25, further comprising instructions that cause machine to perform operations to:

determine that the destination is not allowed for the object using the first input; and transmit a message to a user that the destination is not allowed, wherein the pathway is established between the current location of the object and the destination in response to receipt of a response to the message.

29. A method for intelligent pathway access control, the method comprising:

obtaining a destination for an object and a reason the object is traveling to the destination;

comparing a rule model to the destination, an identity of the object, and the reason, wherein the rule model includes rule preferences determined based on prior authorization request responses for the reason;

establishing a pathway between a current location of the object and the destination using an electronic map of locations between the current location and the destination based on the results of the comparison;

identifying a set of access control features along the established pathway;

calculating a time window for arrival for each access control feature of the set of access control features; and allowing the object passage through an access control feature of the set of access control features based on a proximity of the object to the access control feature and a respective time window for arrival for the access control feature.

30. The method of claim 29, further comprising:
determining that the object is not in proximity to the access control feature of the set of access control features within a corresponding time window for arrival; and
in response to the determining, transmitting a notification to one or more users.

31. The method of claim 29, further comprising:
transmitting a notification to one or more users including an identity of the object, the destination, and the reason; and
in response to receiving a response to the notification, establishing the pathway.

32. The method of claim 29, further comprising:
determining a user responsible for approving the reason the object is traveling to the destination;
evaluating a set of prior responses from the user to reasons for traveling to a destination; and
establishing the pathway based on the evaluation.

33. The method of claim 29, further comprising:
comparing the reason the object is traveling to the destination to a repository of reasons; and
establishing the pathway based on the comparison.

34. The method of claim 33, wherein the repository of reasons corresponds to the object.

35. The method of claim 29, further comprising:
determining that the object is in proximity to the access control object using image recognition.

36. The method of claim 29, wherein allowing passage through the access control feature includes activating an unlock function of an electronically controlled lockset.

37. The method of claim 29, wherein the destination and the reason the object is traveling to the destination are obtained from a computing device located on a first side of a first access control feature of the set of access control features.

38. The method of claim 29, further comprising:
identifying the object in a room using computer vision; and
determining the current location of the object based on the identifying of the object in the room.

39. The method of claim 29, further comprising:
transmitting a graphical user interface to a display device, the graphical user interface including a first interface window including a first selectable user interface element; and
detecting a selection of the first selectable user interface element as a first input, wherein the first input is used in obtaining the destination for the object.

40. The method of claim 39, wherein the graphical user interface further includes a second interface window including a second selectable user interface element; and further comprising:
detecting a selection of the second selectable user interface element as a second input, wherein the second input is used in obtaining the reason the object is traveling to the destination.

41. The method of claim 39, further comprising:
determining that the destination is not allowed for the object using the first input; and
altering the destination based on the determination.

42. The method of claim 39, further comprising:
determining that the destination is not allowed for the object using the first input; and
transmitting a message to a user that the destination is not allowed, wherein establishing the pathway between the current location of the object and the destination is in response to receiving a response to the message.

* * * * *